US012311592B2

United States Patent
Harasawa et al.

(10) Patent No.: US 12,311,592 B2
(45) Date of Patent: May 27, 2025

(54) MOLDING SYSTEM, SUPPORT ARM, RESIN MOLDING DEVICE, METHOD FOR SUPPORTING SUPPORTED MEMBER, MOLD, AND METHOD FOR PRODUCING MOLDED BODY

(71) Applicant: KYORAKU CO., LTD., Kyoto (JP)

(72) Inventors: Yuki Harasawa, Yamato (JP); Takeshi Kato, Kakamigahara (JP); Tsutomu Ouchi, Tsuchiura (JP); Tatsuya Fukuda, Kakamigahara (JP); Yosuke Hayashi, Yamato (JP); Takafumi Funato, Yamato (JP); Seiji Ono, Yamato (JP)

(73) Assignee: KYORAKU CO., LTD., Kyoto (JP)

( * ) Notice: Subject to any disclaimer, the term of this patent is extended or adjusted under 35 U.S.C. 154(b) by 403 days.

(21) Appl. No.: 17/773,176

(22) PCT Filed: Dec. 8, 2020

(86) PCT No.: PCT/JP2020/045650
§ 371 (c)(1),
(2) Date: Apr. 29, 2022

(87) PCT Pub. No.: WO2021/117713
PCT Pub. Date: Jun. 17, 2021

(65) Prior Publication Data
US 2022/0371257 A1 Nov. 24, 2022

(30) Foreign Application Priority Data

Dec. 12, 2019 (JP) .................................. 2019-224778
Feb. 28, 2020 (JP) .................................. 2020-032621
Feb. 28, 2020 (JP) .................................. 2020-033295

(51) Int. Cl.
*B29C 51/02* (2006.01)
*B29C 51/10* (2006.01)
(Continued)

(52) U.S. Cl.
CPC ............ *B29C 51/02* (2013.01); *B29C 51/105* (2013.01); *B29C 51/261* (2013.01); *B29C 51/36* (2013.01);
(Continued)

(58) Field of Classification Search
CPC ..... B29C 51/267; B29C 51/46; B29C 51/105; B29C 51/02; B29C 2948/92066; B29C 48/92; B29C 2948/92019; B29C 48/08
See application file for complete search history.

(56) References Cited

U.S. PATENT DOCUMENTS

| 3,726,148 A | * | 4/1973 | Jope | ....................... | B65H 20/04 |
| | | | | | 74/79 |
| 2017/0274571 A1 | * | 9/2017 | Altonen | ................. | G06N 20/00 |

FOREIGN PATENT DOCUMENTS

| CN | 107379494 A | * | 11/2017 | ............. | B29C 48/30 |
| JP | H06-59746 A | | 3/1994 | | |

(Continued)

OTHER PUBLICATIONS

International Search Report mailed Mar. 2, 2021, in corresponding to International Application No. PCT/JP2020/045650; 10 pages (with English Translation).

*Primary Examiner* — Susan D Leong
*Assistant Examiner* — Vipul Malik
(74) *Attorney, Agent, or Firm* — Maier & Maier, PLLC

(57) ABSTRACT

A molding system capable of reducing molding defects including first and second parison forming devices; first and second molds configured to be opened and closed; and a control unit. The first parison forming device comprises a (Continued)

first extruder, a first accumulator, and a first injection head, the first parison forming device is configured to form a first parison by injecting a first molten resin from the first injection head after the first molten resin extruded from the first extruder is accumulated in the first accumulator, the second parison forming device comprises a second extruder, a second accumulator, and a second injection head, the second parison forming device is configured to form a second parison by injecting a second molten resin from the second injection head after the second molten resin extruded from the second extruder is accumulated in the second accumulator.

4 Claims, 21 Drawing Sheets

(51) Int. Cl.
*B29C 51/26* (2006.01)
*B29C 51/36* (2006.01)
*B29C 51/46* (2006.01)
*B29L 7/00* (2006.01)
*B29K 101/12* (2006.01)

(52) U.S. Cl.
CPC .......... *B29C 51/46* (2013.01); *B29K 2101/12* (2013.01); *B29L 2007/002* (2013.01)

(56) References Cited

FOREIGN PATENT DOCUMENTS

| | | | |
|---|---|---|---|
| JP | 06315756 A | * | 11/1994 |
| JP | H06-315756 A | | 11/1994 |
| JP | 2014-079901 A | | 5/2014 |
| JP | 2017144630 A | * | 8/2017 |
| JP | 2018-052093 A | | 4/2018 |
| JP | 2019042991 A | * | 3/2019 |
| JP | 6551966 B2 | | 7/2019 |
| WO | WO-2018020891 A1 | * | 2/2018 |

* cited by examiner

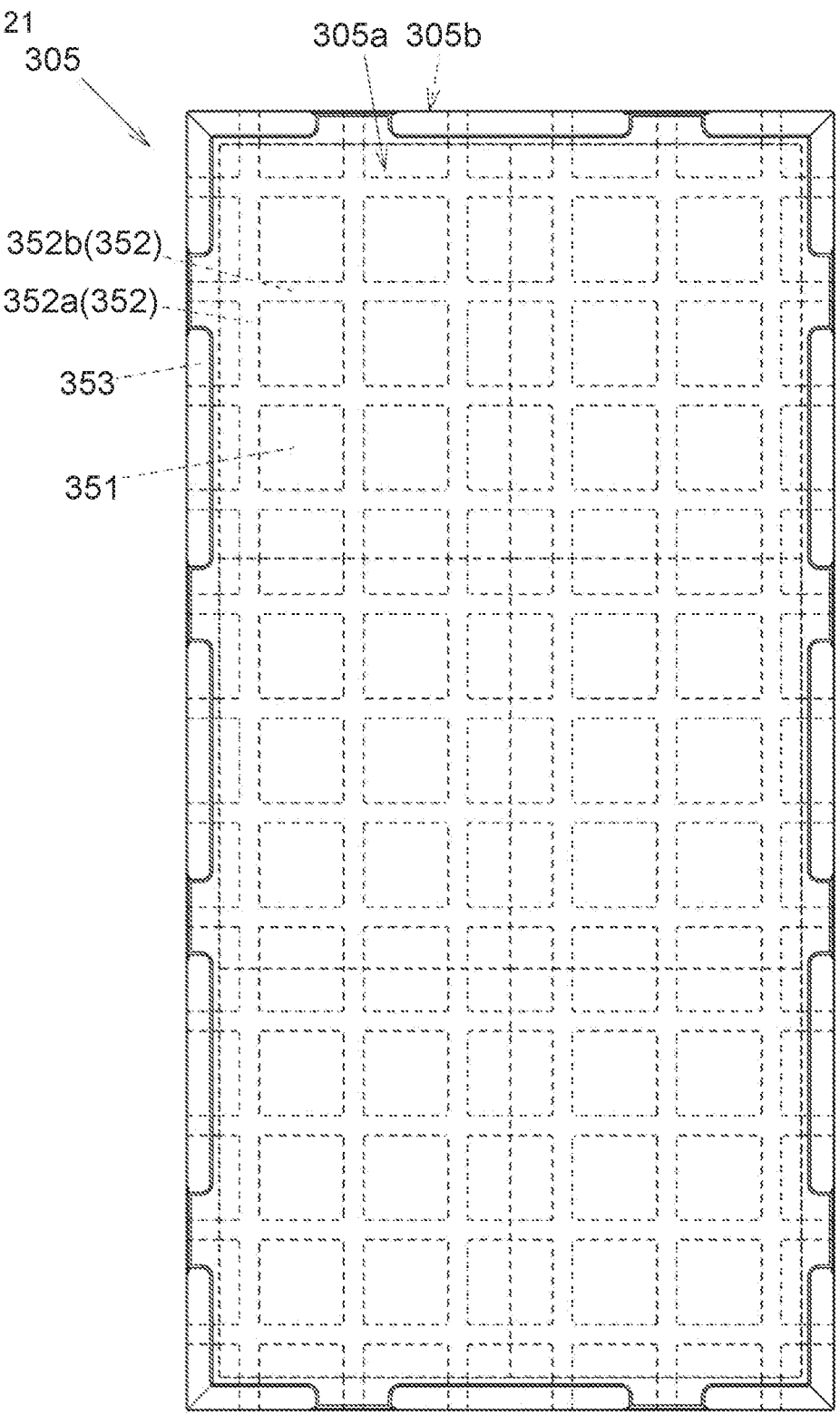

MOLDING SYSTEM, SUPPORT ARM, RESIN MOLDING DEVICE, METHOD FOR SUPPORTING SUPPORTED MEMBER, MOLD, AND METHOD FOR PRODUCING MOLDED BODY

TECHNICAL FIELD

The present invention relates to a molding system, a support arm, a resin molding device and a method for supporting a supported member, a mold and a manufacturing method of a molded body.

BACKGROUND

First Viewpoint

Patent Literature 1 discloses a device for manufacturing a sandwich panel by arranging a core material between a pair of resin sheets extruded respectively from a pair of T dies and molding with a pair of split molds.

Second Viewpoint

There have been disclosed techniques in which a prefabricated molded body is transferred by a support arm toward a molten resin sheet shaped by a mold and welded to the molten resin sheet. For example, Patent Literature 2 discloses a molding method of a sandwich panel including a core material made of a thermoplastic resin interposed between two resin skin material sheets. In this molding method of the sandwich panel, the core material held by a suction plate of a manipulator (support arm) is inserted between thermoplastic resin sheets in the shape of a continuous sheet shaped along a cavity of split molds, and the core material is welded to the thermoplastic resin sheet sucked by the cavity by horizontally moving the manipulator toward the split mold. The manipulator releases the support of the core material and is retracted from between the split molds. Then, the thermoplastic resin sheets are welded from both sides of the core material by clamping the split molds. The molded sandwich panel is removed by opening the split molds.

Third Viewpoint

There have been proposed techniques in which a sheet-shaped thermoplastic resin is arranged between split molds and the molds are clamped to manufacture a resin molded body. For example, in a manufacturing method of a resin molded body disclosed in Patent Literature 3, the thermoplastic resin sheet in a molten state is hung down on a side of a cavity of one of the molds, the thermoplastic resin sheet is vacuum-sucked from a side of the cavity, and the molds are clamped after the resin sheet is shaped substantially along the cavity. After the above-mentioned mold clamping, the thermoplastic resin sheet is pressurized to the side of the cavity by pressurized fluid blown from the mold facing the cavity, and the thermoplastic resin sheet is formed into the shape along the cavity.

PATENT LITERATURE

Patent Literature 1: JP-A-2014-79901
Patent Literature 2: JP-B-6551966
Patent Literature 3: JP-A-2018-52093

SUMMARY

First Viewpoint

In the device disclosed in Patent Literature 1, in general, the injection of the resin sheet and mold opening and closing are hydraulically driven. In the hydraulic drive, the timing of injecting the resin sheet and mold opening and closing is likely to deviate from a predetermined state because the operating speed is affected by oil temperature and the like. If the timing of injecting the resin sheet and mold opening and closing deviates from the predetermined state, molding defects are likely to occur.

The present invention has been made in view of such circumstances and provides a molding system capable of reducing the molding defects.

Second Viewpoint

A support beam of the support arm may bend at its free end side when the core material is pressed to a side of the mold, and the core material may not be sufficiently pressed. If the welding between the core material and the thermoplastic resin sheet is insufficient, the core material may fall off from the thermoplastic resin sheet or may be misaligned. Further, although it is possible to adjust the position and angle of the support arm each time, such a method may increase the complexity of operation and decrease reproducibility due to setup change.

An object of the present invention is to provide a support arm, a resin molding device, and a method of supporting a supported member capable of stably supplying the supported member.

Third Viewpoint

The resin molded body is cooled in the molds and then removed from the molds by opening the molds. However, when the thermoplastic resin sheet is sucked by one mold and molded by pressing it from the other mold, a temperature difference may occur on both sides of the thermoplastic resin sheet, and the molded body may be warped.

An object of the present invention is to provide a mold and a manufacturing method of a molded body capable of realizing excellent molding.

First Viewpoint

According to the present invention, provided is a molding system, comprising: first and second parison forming devices; first and second molds configured to be opened and closed; and a control unit, wherein the first parison forming device comprises a first extruder, a first accumulator, and a first injection head, the first parison forming device is configured to form a first parison by injecting a first molten resin from the first injection head after the first molten resin extruded from the first extruder is accumulated in the first accumulator, the second parison forming device comprises a second extruder, a second accumulator, and a second injection head, the second parison forming device is configured to form a second parison by injecting a second molten resin from the second injection head after the second molten resin extruded from the second extruder is accumulated in the second accumulator, the first and second parisons are injected between the first and second molds, and the control unit is configured to determine a timing of starting operation of at least one of the first and second parison forming devices and the first and second molds in a next cycle on the basis of history data in a past cycle.

In the present invention, the control unit is configured to determine the timing of starting operation of at least one of the first and second parison forming devices and the first and second molds in the next cycle on the basis of the history data in the past cycle. Therefore, even if the timing of starting operation of at least one of these devices is deviated, the deviation is corrected in the next cycle, so that the timing deviation is suppressed and molding defects are reduced.

Hereinafter, various embodiments of the present invention will be exemplified.

Preferably, the control unit is configured to determine a timing of starting injection of the first and second molten resins in the next cycle on the basis of the history data in the past cycle.

Preferably, the first and second molds are configured to move to a mold opening position, a standby position, and a mold closing position, the standby position is a position in which a distance between the first and second molds is smaller than in the mold opening position and the distance between the first and second molds is larger than in the mold closing position, and the control unit is configured to determine a timing at which the first and second molds start moving from the mold opening position to the standby position in the next cycle on the basis of the history data in the past cycle.

Preferably, the first molten resin is injected by hydraulic drive, and the control unit is configured to determine a condition of hydraulic pressure of the hydraulic drive in the next cycle on the basis of the history data in the past cycle.

Preferably, the first parison is a first resin sheet, the first resin sheet is fed by a roller arranged between the first injection head and the first and second molds, and the control unit is configured to determine a rotation speed of the roller in the next cycle on the basis of the history data in the past cycle.

Preferably, the control unit is configured to determine a timing of starting rotation of a screw of the first extruder in the next cycle on the basis of the history data in the past cycle.

Second Viewpoint

The support arm of the present invention comprises a support beam; a first support body supporting a supported member on a distal end side of the support beam; and a second support body provided to be movable with respect to the support beam on a proximal end side of the support beam and supporting the supported member.

The resin molding device of the present invention comprises a support arm comprising a support beam, a first support body supporting a supported member on a distal end side of the support beam, and a second support body provided to be movable with respect to the support beam on a proximal end side of the support beam and supporting the supported member; a mold comprising a first mold and a second mold; and a resin supply device configured to supply a molten resin sheet to the first mold.

The method of supporting a supported member in the present invention is a method of supporting the supported member in a resin molding device. The resin molding device comprises a support arm comprising a support beam, a first support body supporting a supported member on a distal end side of the support beam, and a second support body provided to be movable with respect to the support beam on a proximal end side of the support beam and supporting the supported member; and a mold sucking a molten resin sheet, and the method comprises a step of moving the support arm so that the supported member supported by the first support body and the second support body abuts against the molten resin sheet on the mold.

According to the present invention, a support arm, a resin molding device, and a method of supporting a supported member capable of stably supplying the supported member can be provided.

Third Viewpoint

The mold of the present invention comprises a first mold and a second mold configured to sandwich a molten resin sheet to mold a molded body, wherein the first mold comprises a first abutting surface configured to abut against the molten resin sheet and a projecting surface projecting from the first abutting surface, and the second mold comprises a second abutting surface corresponding to the first abutting surface at a position facing the projecting surface.

The manufacturing method of a molded body of the present invention is a manufacturing method of a molded body, using a resin supply device, a first mold, and a second mold, comprising a supply step of supplying a molten resin sheet between the first mold and the second mold by the resin supply device; and a mold clamping step of bringing the first mold and the second mold relatively close to each other and clamping the first mold and the second mold in contact with the molten resin sheet.

According to the present invention, a mold and a manufacturing method of a molded body capable of realizing excellent molding can be provided.

BRIEF DESCRIPTION OF DRAWINGS

FIG. 20C is an enlarged view showing a state in which the first mold and the second mold according to the embodiment of the third viewpoint of the present invention are clamped in which a slide portion is pushed in.

FIG. 21 shows the molded body manufactured by the resin molding device according to the embodiment of the third viewpoint of the present invention.

DETAILED DESCRIPTION

Hereinafter, embodiments of the present invention will be described. Various characteristics in the embodiments described below can be combined with each other. Further, the invention is independently established for each characteristic.

First Viewpoint

1. Configuration of Molding System

Figure 1:
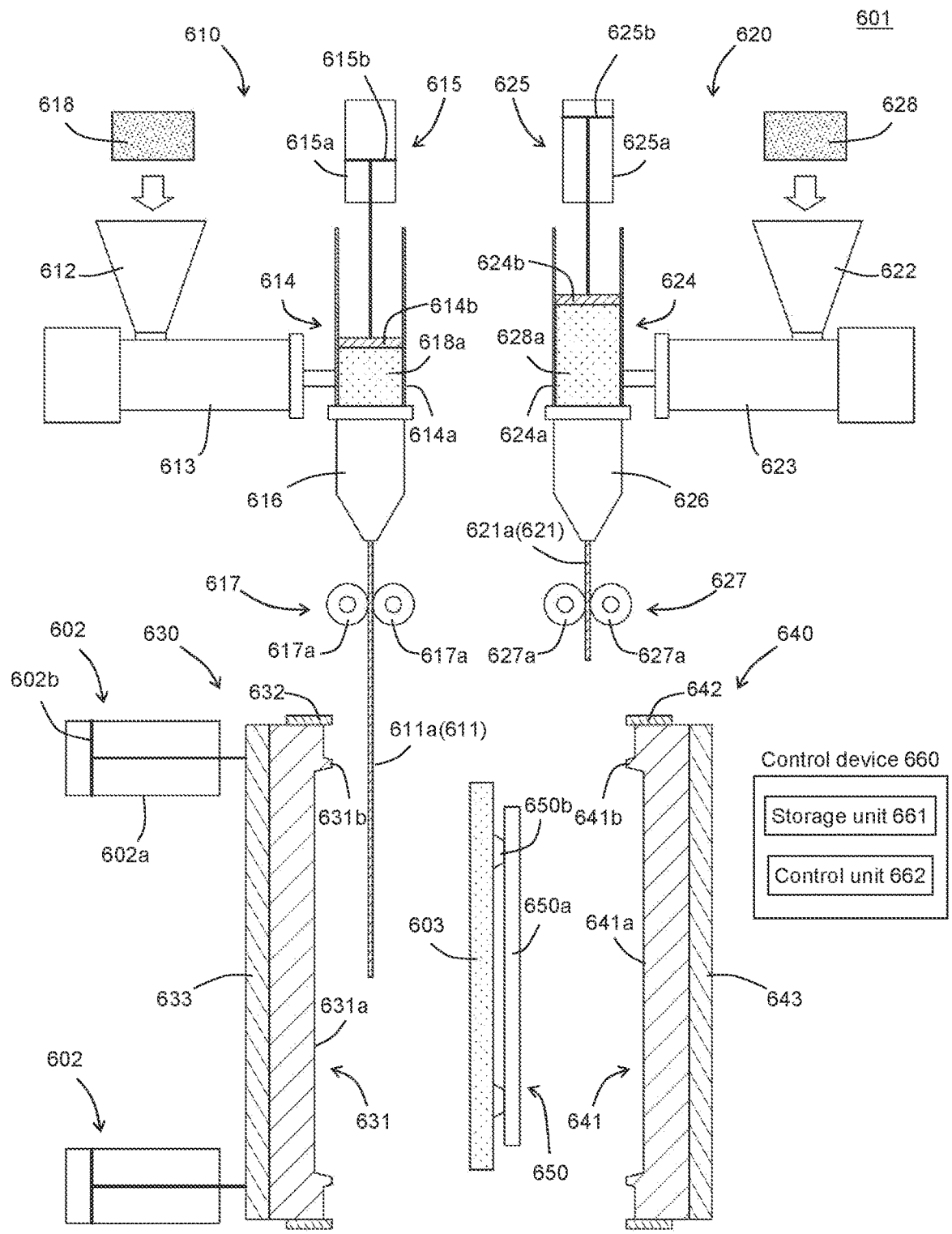
FIG. 1 shows a configuration of a molding system 601 of the first viewpoint of the present invention and shows a state immediately before performing a step C4 in a flowchart of FIG. 2.

As shown in FIG. 1, a molding system 601 of one embodiment of the present invention includes first and second parison forming devices 610, 620, first and second mold units 630, 640 configured to be opened and closed, a robot hand 650, and a control device 660.

The first and second parison forming devices 610, 620 are devices configured to form first and second parisons 611, 621. The parisons 611, 621 are made of molten resin. The parisons 611, 621 are first and second resin sheets 611a, 621a in the present embodiment but may have a different shape, such as a cylindrical shape.

The parison forming devices 610, 620 include first and second hoppers 612, 622, first and second extruders 613, 623, first and second accumulators 614, 624, first and second hydraulic mechanisms 615, 625 for injection, first and second injection heads 616, 626, and first and second roller units 617, 627. First and second raw resins 618, 628 fed from the hoppers 612, 622 into the extruders 613, 623 are melt-kneaded in the extruders 613, 623 to become first and second molten resins 618a, 628a, which are extruded and accumulated in the accumulators 614, 624. The accumulators 614, 624 include cylinders 614a, 624a, and the pistons 614b, 624b slidable inside them. In the present embodiment, the injection heads 616, 626 are configured with a T die.

The pistons 614b, 624b are driven (that is, hydraulically driven) by the hydraulic mechanisms 615, 625, so that the molten resins 618a, 628a in the accumulators 614, 624 are injected from the injection heads 616, 626, and the parisons 611, 621 made of the resin sheets 611a, 621a are formed. The hydraulic mechanisms 615, 625 include cylinders 615a, 625a, and pistons 615b, 625b slidable inside the. The pistons 615b, 625b are connected to the pistons 614b, 624b. The pistons 615b, 625b are configured to be driven by controlling the hydraulic pressure in the cylinders 615a, 625a.

The roller units 617, 627 are arranged between the injection heads 616, 626 and first and second molds 631, 641. The roller units 617, 627 have a pair of rollers 617a, 627a, respectively, and the resin sheets 611a, 621a are sandwiched by the pair of rollers 617a, 627a. Therefore, the speed at which the resin sheets 611a, 621a pass through the roller units 617, 627 can be adjusted by changing the rotation speed of the rollers 617a, 627a.

The mold units 630, 640 include the first and second molds 631, 641, first and second mold frames 632, 642, and first and second platens 633, 643.

The molds 631, 641 include cavity surfaces 631a, 641a having a shape corresponding to the outer shape of a desired molded body and pinch-off portions 631b, 641b surrounding the cavity surfaces 631a, 641a. The cavity surfaces 631a, 641a are provided with depressurizing suction holes (not shown), and the resin sheets 611a, 621a can be suctioned to be formed into a shape along the cavity surfaces 631a, 641a.

The mold frames 632, 642 are arranged along the peripheral surface of the molds 631, 641, and are configured to be slidable with respect to the molds 631, 641 in an opening and closing direction of the molds 631, 641. The mold frames 632, 642 suction the resin sheets 611a, 621a under reduced pressure and press them against the molds 631, 641 and thus facilitate the suction of the resin sheets 611a, 621a by the molds 631, 641.

The platens 633, 643 are fixed to a mold opening and closing device (not shown), and the molds 631, 641 can be fixed to the mold opening and closing device via the platens 633, 643. The mold opening and closing device can move the platens 633, 643 symmetrically with respect to a plane passing through the center of the platens 633, 643.

A hydraulic mechanism 602 moves the platen 633 in the opening and closing direction of the molds 631, 641, so that the molds 631, 641 can be opened and closed. The hydraulic mechanism 602 includes a cylinder 602a and the piston 602b slidable inside the cylinder. The piston 602b is connected to the platen 633. The piston 602b can be driven by controlling the hydraulic pressure in the cylinder 602a.

The robot hand 650 has a function of pressing a core material 603 against the resin sheet 611a. The robot hand 650 includes a base 650a and a suction pad 650b fixed to the base. The suction pad 650b can hold the core material 603 by suctioning it under reduced pressure. The base 650a is attached to a robot (not shown) and is three-dimensionally movable. The core material 603 is made of foamed resin, and the core material 603 can be welded to the resin sheets 611a, 621a by melting the core material 603 by the heat of the resin sheets 611a, 621a.

The control device 660 includes a storage unit 661 and a control unit 662. The storage unit 661 stores history data in the past cycle and a program executed by the control unit 662. The control unit 662 controls the operation of the molding system 601. The function executed by the control unit 662 is realized by a calculation device executing the program stored in the storage unit 661.

The control unit 662 is configured to determine the timing of starting the operation in the next cycle for at least one of the parison forming devices 610, 620 and the molds 631, 641 on the basis of the history data in the past cycle. Consequently, even if the timing of starting the operation is deviated in the past cycle, the deviation is corrected in the next cycle, so that the timing deviation is suppressed, and molding defects are reduced. The history data of the past cycle may be the history data of the past one cycle (e.g., the immediately preceding one cycle) or may be data obtained from the history data of a plurality of past cycles (e.g., average value).

2. Manufacturing Method of Molded Body

Figure 2:
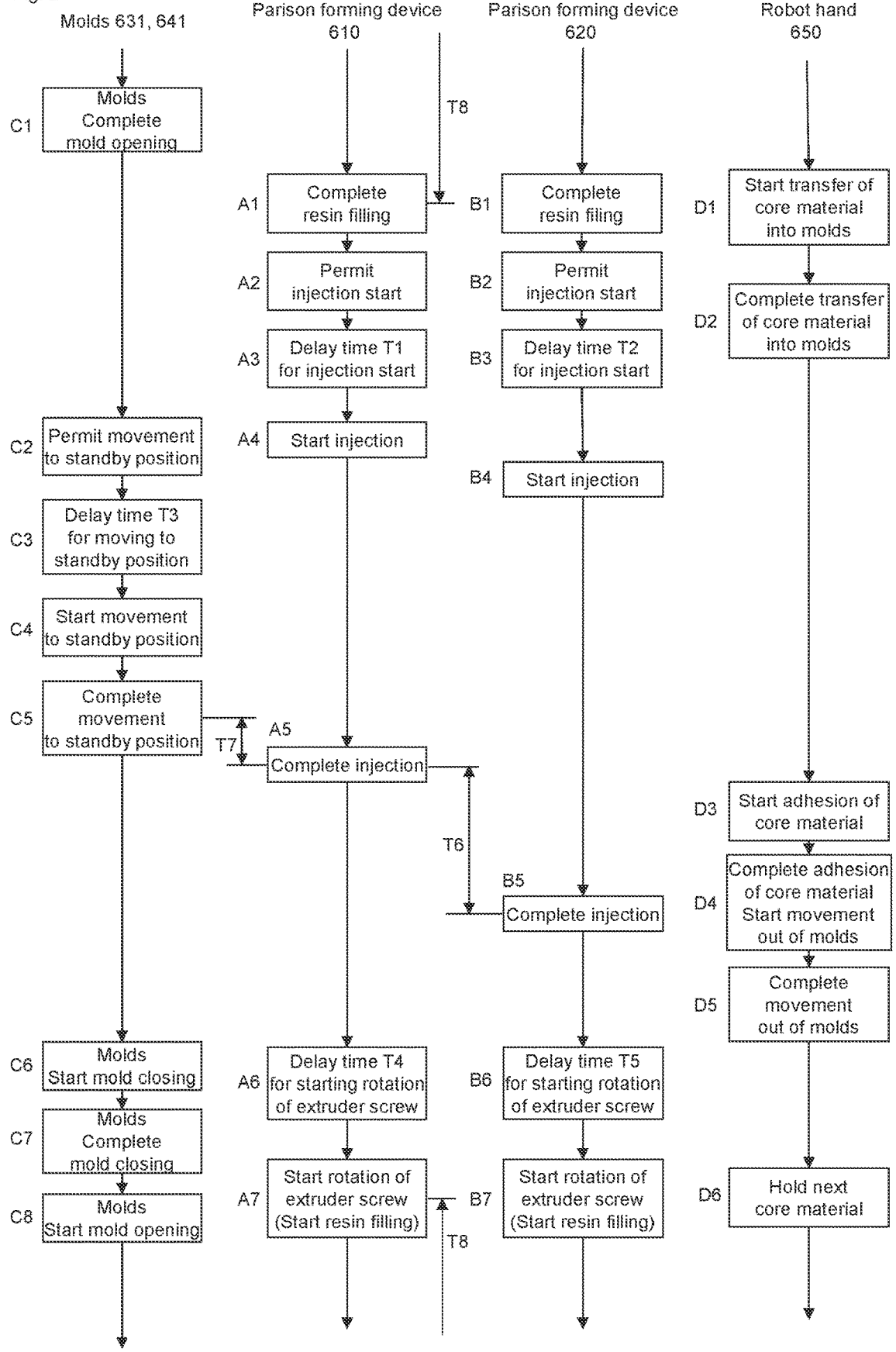
FIG. 2 is a flowchart showing a manufacturing method of a molded body using the molding system 601.

With reference to FIG. 2, a method of manufacturing a molded body using the molding system 601 will be described. In the following description, it is assumed that the molded body has a structure in which a burr is provided around a sandwich panel (molded product) formed by sandwiching the core material 603 between the resin sheets 611a, 621a, though it is possible to manufacture a molded body having a different structure. Further, in this manufacturing method, it is assumed that the molded bodies are manufactured one after another by repeating the cycle for manufacturing the molded body. FIG. 2 shows steps for one cycle, and it is assumed that steps A7, B7, C8, D6 are followed by the execution of steps A1, B1, C1, D1.

For convenience, the following state is regarded as an initial state. In the parison forming devices 610, 620, screws of the extruders 613, 623 are rotating to fill the accumulators 614, 624 with the molten resins 618a, 628a. The molds 631, 641 are being opened. The robot hand 650 holds the core material 603 outside the molds 631, 641.

When time has elapsed from the initial state, the opening of the molds 631, 641 is completed in the step C1, and the filling of the accumulators 614, 624 with the resin is completed in the steps A1, B1. After the mold opening, the molds 631, 641 stand by in the open position.

When the opening of the molds 631, 641 in the step C1 is completed, the robot hand 650 starts moving so that the core material 603 is arranged in the molds 631, 641 (that is, in the space between the molds 631, 641) in the step D1 and the movement is completed in a step D2. After the movement is completed, the robot hand 650 stands by in that state.

When the resin filling in the steps A1, B1 is completed, the control unit 662 permits the injection of the molten resins 618a, 628a in the parison forming devices 610, 620 in steps A2, B2. At this time, delay times T1, T2 for starting injection in steps A3, B3 are set. In steps A4, B4, the injection of the molten resins 618a, 628a is started after the delay time T1, T2 have elapsed. The molten resins 618a, 628a are injected to form the resin sheets 611a, 621a. The resin sheets 611a, 621a are sandwiched by the rollers 617a, 627a and fed downward as the rollers 617a, 627a rotate. Therefore, the speed at which the resin sheets 611a, 621a move downward can be adjusted by changing the rotation speed of the rollers 617a, 627a.

It is assumed that the core material 603 is first adhered to the resin sheet 611a and then adhered to the resin sheet 621a. Therefore, it is preferable to set the timing of starting the injection of the molten resin 628a later than the timing of starting the injection of the molten resin 618a so that the temperature of the resin sheet 621a will not become too low when the core material 603 is adhered to the resin sheet 621a. Therefore, it is preferable that T2>T1. In one example, T1 is 0.

Figure 3:
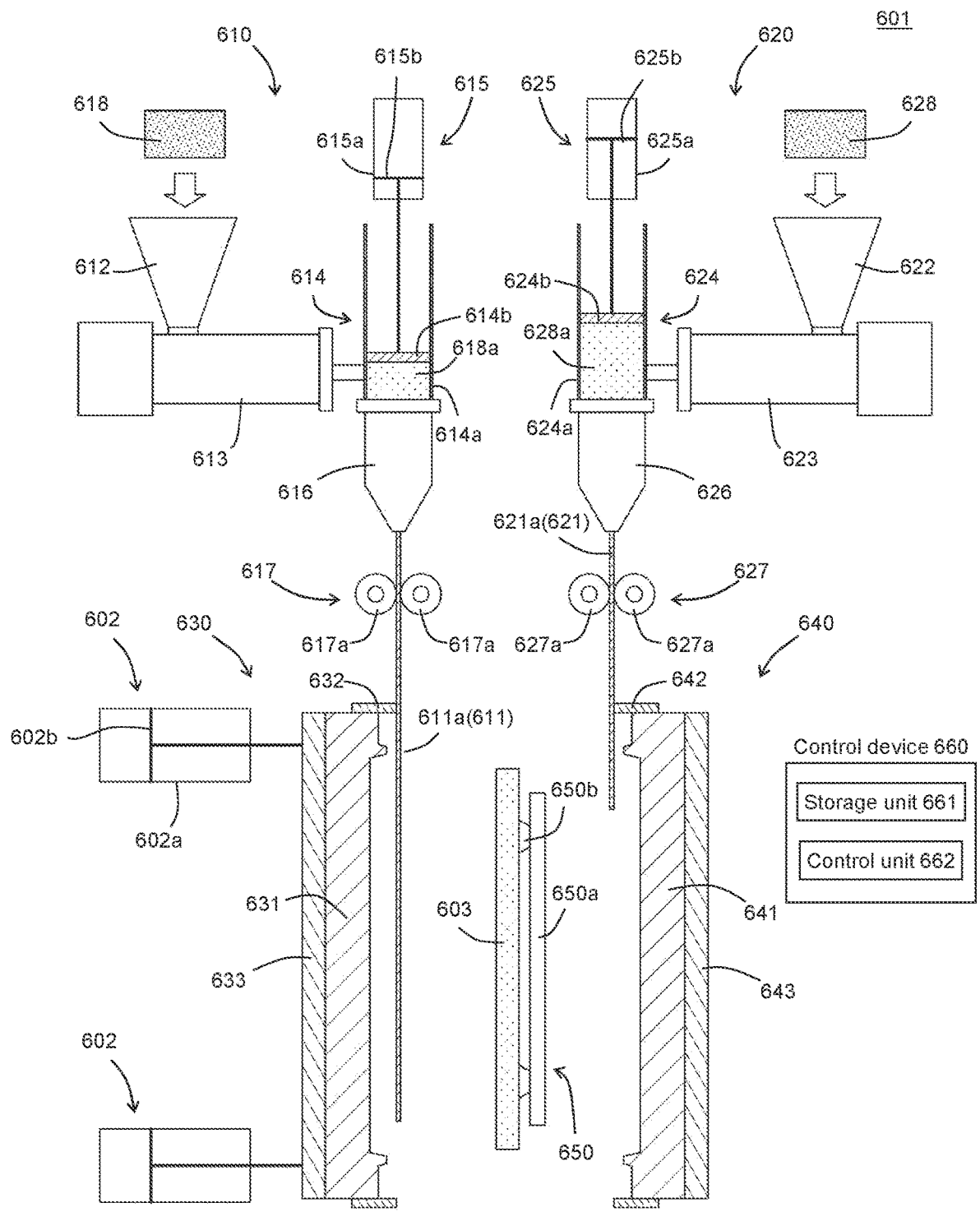
FIG. 3 shows the configuration of the molding system 601 and shows a state immediately after performing a step C5 in the flowchart of FIG. 2.

When the injection of the molten resin 618a is started in the step A4, the control unit 662 permits the molds 631, 641 to move from a mold opening position shown in FIG. 1 to a standby position shown in FIG. 3 in a step C2. At this time, a delay time T3 for moving to the standby position in a step C3 is set. In a step C4, after the delay time T3 has elapsed, the movement of the molds 631, 641 to the standby position is started. In a step C5, the movement of the molds 631, 641 to the standby position is completed.

The standby position is a position in which the distance between the molds 631, 641 is smaller than in the mold opening position and the distance between the molds 631, 641 is larger than in the mold closing position. In the mold opening position, the mold frames 632, 642 are not in contact with the resin sheets 611a, 621a, and thus in this state, the resin sheets 611a, 621a cannot be sucked under reduced pressure by the molds 631, 641. On the other hand, in the standby position, the mold frames 632, 642 can be brought into contact with the resin sheets 611a, 621a, and thus the resin sheets 611a, 621a can be sucked under reduced pressure by the molds 631, 641. In this regard, instead of using the mold frames 632, 642, the resin sheets 611a, 621a may be held by another means (e.g., expander) so that the resin sheets 611a, 621a come into contact with the molds 631, 641.

If the molds 631, 641 are in the standby position while lower ends of the resin sheets 611a, 621a are higher than upper ends of the molds 631, 641, there is a possibility that the resin sheets 611a, 621a may interfere with the molds 631, 641 (be arranged on the top of the molds 631, 641) when the resin sheets 611a, 621a are shaken. In the present embodiment, in order to avoid such a problem, the movement of the molds 631, 641 to the standby position is completed when the lower ends of the resin sheets 611a, 621a reach a position lower than the upper ends of the molds 631, 641. Further, the delay time T3 is set, and the movement of the molds 631, 641 is started after the delay time T3 has elapsed so that the movement of the molds 631, 641 to the standby position is not completed too early.

After the step C5, the completion of injection of the molten resin 618a is detected in a step A5. The completion of injection may be detected by detecting that the lower end of the resin sheet 611a has reached a reference position, by detecting that the remaining amount of the molten resin 618a in the accumulator 614 has reached a reference value, or by another method. After the step A5, the resin sheet 611a is sucked under reduced pressure by the mold frame 632, and the mold frame 632 is retracted in that state to bring the resin sheet 611a into contact with the pinch-off portion 631b. In that state, the mold 631 sucks the resin sheet 611a under reduced pressure, so that the resin sheet 611a can be shaped into a shape along the cavity surface 631a.

Figure 4:
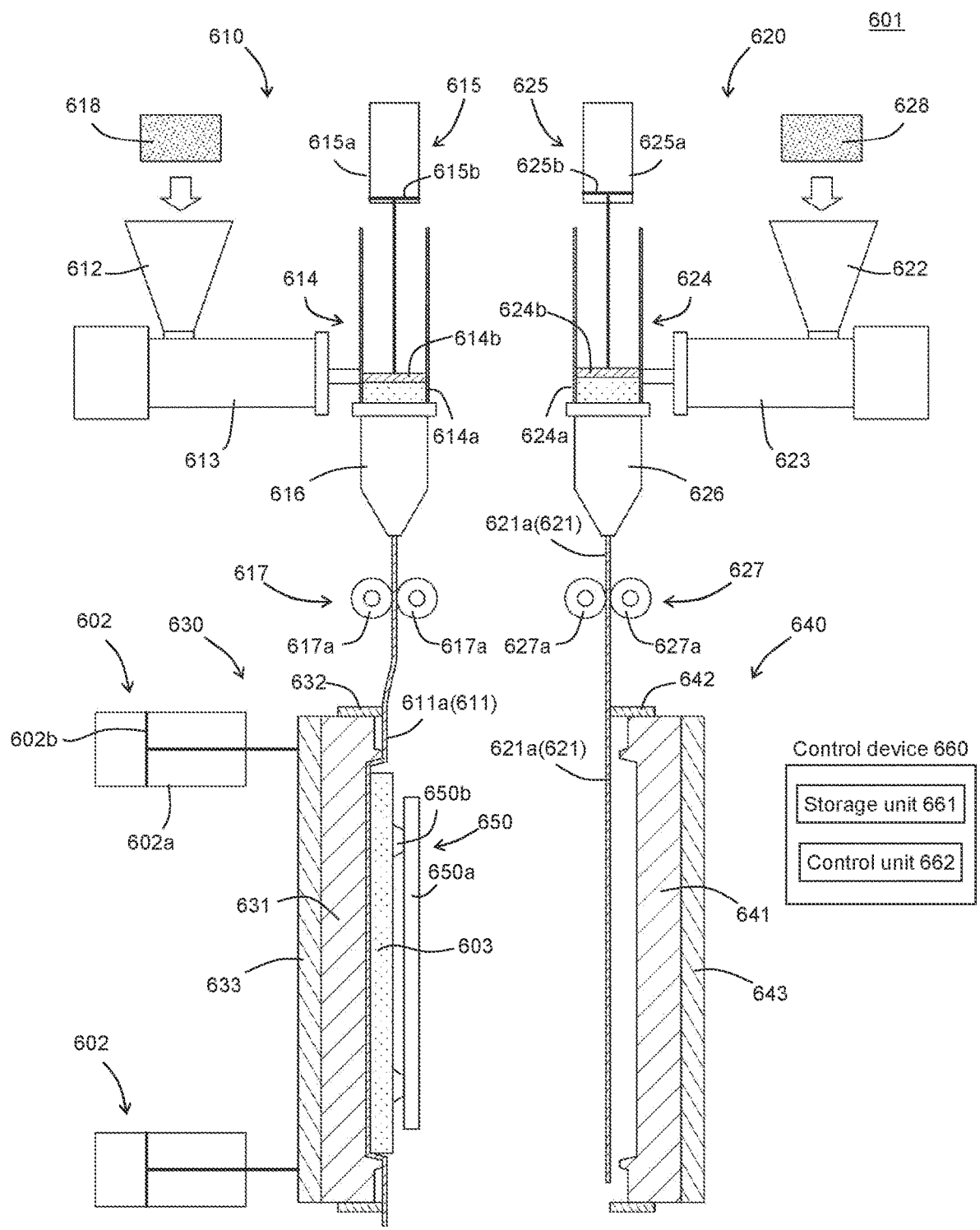
FIG. 4 shows the configuration of the molding system 601 and shows a state immediately after the adhesion of a core material 603 is completed in a step D5 in the flowchart of FIG. 2.

Next, in steps D3 to D4, as shown in FIG. 4, the robot hand 650 holding the core material 603 between the molds 631, 641 moves toward the mold 631, so that the core material 603 is welded and adhered to the resin sheet 611a. After that, the suction of the core material 603 by the suction pad 650b is released, the robot hand 650 starts to leave the space between the molds 631, 641, and the movement of the robot hand 650 out of the molds is completed in a step D5. A core material 603 to be used in the next cycle is prepared in advance outside the molds, and in a step D6, the robot hand 650 sucks and holds the core material 603 to be used in the next cycle.

After the step A5, the completion of injection of the molten resin 628a is detected in a step B5. The method for detecting the completion of injection is the same as in the step A5. Further, similarly to the step A5, the mold 641 sucks the resin sheet 621a under reduced pressure, so that the resin sheet 621a can be shaped into a shape along the cavity surface 641a.

After the steps A5, B5, and D5, the movement of the molds 631, 641 to the mold closing position is started in a step C6, and the movement is completed in a step C7. At this time, the core material 603 is welded to the resin sheet 621a, and the resin sheets 611a, 621a are welded to each other at their peripheral portions, so that the molded body in which a burr is provided around a sandwich panel (molded product) is formed.

Next, the movement of the molds 631, 641 to the mold opening position is started in a step C8, and the movement is completed in the step C1. After the molds are opened, the molded body is removed from the molds 631, 641. To prevent the molded body from falling unexpectedly, its portion above the molds 631, 641 may be clamped by a clamping unit (not shown) before the molds are opened.

Next, after delay times T4, T5 for starting the rotation of the extruder screws set by the control unit 662 have elapsed in steps A6 and B6, the rotation of the screws of the extruders 613, 623 is started to start filling the accumulators 614, 624 with the molten resins 618a, 628a in steps A7 and B7. While the delay times T4, T5 are not necessary when the molding system 601 is operated independently, the molding system 601 in the present embodiment is intended to be operated in conjunction with a burr removal system (not shown) configured to remove the burr from the molded body. To operate them in conjunction with each other, it is necessary to match the cycle time of the burr removal system and the cycle time of the molding system 601. Without the delay times T4, T5, the cycle time of the molding system 601 would be shorter than the cycle time of the burr removal system. By setting the delay times T4, T5, their cycle times are matched. Further, the delay times T4, T5 are provided before the rotation of the screws of the extruders 613, 623 is started. This is because, if the delay time is provided after the filling of the accumulators 614, 624 with the molten resins 618a, 628a is completed, the state (e.g., resin pressure) of the molten resins 618a, 628a in the accumulators 614, 624 changes during the time period from the completion of filling to the start of injection, which is not preferable.

3. Correction Method

Ideally, the timing at which each of the steps described in "2. Manufacturing Method of Molded Body" is performed does not fluctuate with each cycle. However, in reality, the timing may deviate due to fluctuations in the oil temperature of the hydraulic mechanism, fluctuations in the ambient environment (temperature, humidity, and the like), fluctuations in materials, and the like. Since the timing deviation causes molding defects, the control unit 662 performs various corrections to reduce the timing deviation.

3-1. Correction of Injection Start Timing

A time difference T6 between the completion of injection in the step A5 and the completion of injection in the Step B5 is set so that the temperature of the resin sheets 611a, 621a becomes optimum when the core material 603 is welded to the resin sheets 611a, 621a. If the time difference T6 is shorter or longer than a reference value, molding defects are likely to occur.

The molds 631, 641 cannot be closed until the robot hand 650 moves out of the molds. Therefore, if the time difference T6 is too short, the time between the step B5 and the step C6 will be longer than expected. As a result, the temperature of the resin sheet 621a becomes too low when the core material 603 is welded to the resin sheet 621a, and welding defects are likely to occur. On the other hand, if the time difference T6 is too long, the time between the step A5 and the step C6 will be longer than expected. As a result, the temperature of the resin sheet 611a becomes too low when the resin sheets 611a, 621a are welded to each other, and defects in welding between the resin sheets 611a, 621a are likely to occur.

Therefore, to reduce the deviation of the time difference T6 from a target value, the control unit 662 is configured to determine a timing of starting the injection of the first and second molten resins in the next cycle on the basis of the history data in the past cycle. In one example, the history data are the time difference T6 between the time when the injection of the first molten resin is completed (step A5) and the time when the injection of the second molten resin is completed (step B5). The timing of starting the injection of the first and second molten resins can be adjusted, for example, by changing at least one of the delay times T1 and T2. In one example, when the time difference T6 of the immediately preceding cycle is longer or shorter than the target value by p seconds, a correction is made to shorten or lengthen the delay time T2 by p seconds without changing the delay time T1. Consequently, it is expected that the time difference T6 in the next cycle will approach the target value.

3-2. Correction of Timing of Mold Movement to Standby Position

If the molds 631, 641 move too early from the mold opening position to the standby position in the steps C4 to C5, the resin sheets 611a, 621a are likely to interfere with the molds 631, 641. If they move too late, the mold 631 does not reach the standby position at the time when the injection is completed in the step A5, and shaping defects of the resin sheet 611a on the mold 631 are likely to occur.

Therefore, to suppress the occurrence of such a problem, the control unit 662 is configured to determine the timing at which the molds 631, 641 start moving from the mold opening position to the standby position in the next cycle, on the basis of the history data in the past cycle. In one example, the history data are a time difference T7 between the time when the movement of the molds 631, 641 to the standby position is completed (step C5) and the time when the injection of the first molten resin is completed (step A5). The timing of starting the movement of the molds 631, 641 can be adjusted, for example, by changing the delay time T3. In one example, when the time difference T7 of the immediately preceding cycle is longer or shorter than a target value by q seconds, a correction is made to lengthen or shorten the delay time T3 by q seconds. Consequently, it is expected that the time difference T7 in the next cycle will approach the target value.

3-3. Correction of Timing of Starting Rotation of Extruder Screw

As described above in connection with the steps A6 and B6, the molding system 601 in the present embodiment is intended to be operated in conjunction with the burr removal system (not shown) configured to remove the burr from the molded body, and the delay times T4, T5 are provided to match the cycle times of both systems.

The cycle time of the molding system 601 depends on a filling time T8 from the start of rotation of the screws in the steps A7, B7 to the completion of resin filling in the steps A1, B1. This filling time T8 tends to be shortened in particular immediately after the start-up of the molding system 601 because the state of the resin in the extruders 613, 623 is not stable. If the filling time T8 becomes shorter than a target value, there is a problem that the cycle times of the molding system 601 and the burr removal system deviate from each other.

Therefore, to suppress the occurrence of such a problem, the control unit 662 is configured to determine the timing of starting the rotation of the screws of the extruders 613, 623 in the next cycle on the basis of the history data in the past cycle. In one example, the history data are the cycle time. The cycle time is, for example, the time from the start of injection in the step A4 in the cycle before the previous cycle to the start of injection in the step A4 in the previous cycle. The timing of starting the rotation of the screws of the extruders 613, 623 can be adjusted, for example, by changing the delay times T4, T5. In one example, when the cycle time in the immediately preceding cycle is longer or shorter than a target value by r seconds, a correction is made to shorten or lengthen the delay times T4, T5 by r seconds. Consequently, it is expected that the cycle time in the next cycle will approach the target value.

3-4. Correction of Injection Time

When the molten resins 618a, 628a are injected by hydraulic drive, the injection time (time from the start to the completion of injection) may fluctuate due to fluctuations in oil temperature and the like, and it is preferable to stabilize the injection time.

Therefore, the control unit 662 is configured to determine a condition of hydraulic pressure of the hydraulic drive in the next cycle on the basis of the history data in the past cycle. In one example, the history data are the injection time. In one example, when a state in which the deviation of the injection time from a target value is equal to or larger than a threshold value occurs in a plurality of successive cycles (e.g., two cycles), the control unit 662 makes a correction to increase or decrease the hydraulic pressure in the next cycle. In one example, when the injection time is longer than the target value, the hydraulic pressure is increased in the next cycle, and when the injection time is shorter than the target value, the hydraulic pressure is decreased in the next cycle. Consequently, it is expected that the injection time will approach the target value in the next cycle.

3-5. Correction of Sheet Length

It is preferable that the length of the resin sheets 611a, 621a when the injection of the molten resins 618a, 628a is completed is constant.

Therefore, the control unit 662 is configured to determine the rotation speed of the rollers 617a, 627a in the next cycle on the basis of the history data in the past cycle. In one example, the history data are the length of the resin sheets 611a, 621a. In one example, when the deviation of the length of the resin sheets 611a, 621a from a target value is equal to or larger than a threshold value in the immediately preceding cycle, the control unit 662 makes a correction to increase or decrease the rotation speed of the rollers 617a, 627a in the next cycle. In one example, when the length of the resin sheets 611a, 621a is longer than the target value, the rotation speed of the rollers 617a, 627a in the next cycle is decreased, and when the length of the resin sheets 611a, 621a is shorter than the target value, the rotation speed of the rollers 617a, 627a in the next cycle is increased. Consequently, it is expected that the length of the resin sheets 611a, 621a in the next cycle will approach the target value. This correction is preferably made in a state where the injection time described above is stable.

Second Viewpoint

Figure 5:
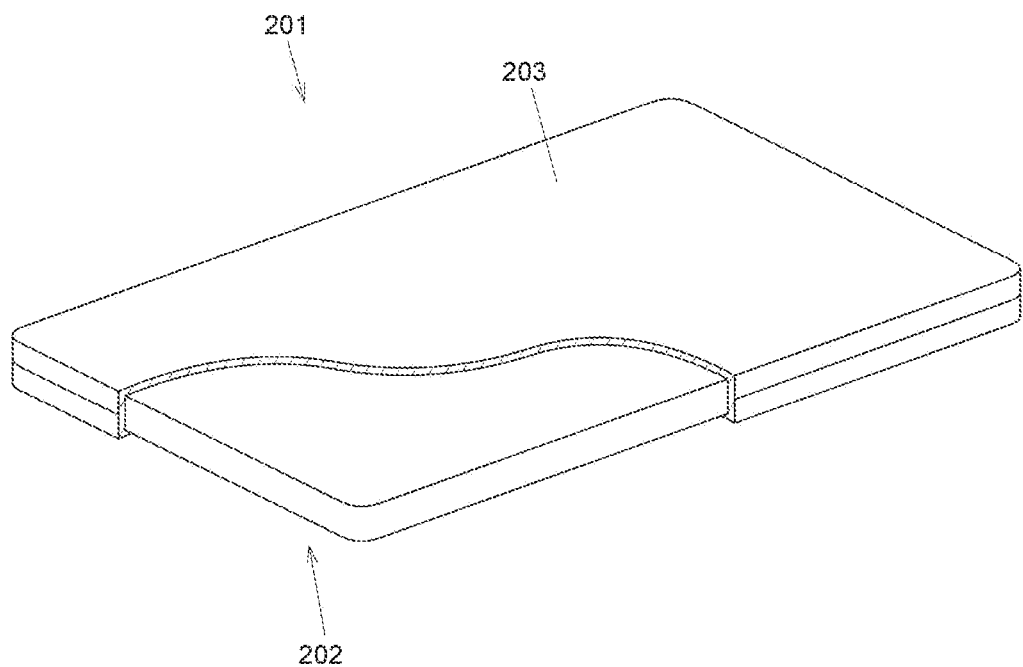
FIG. 5 is a perspective view of a sandwich member according to an embodiment of the second viewpoint of the present invention.

Next, an embodiment of the present invention will be described with reference to the drawings. A sandwich member 201 shown in FIG. 5 is formed in the shape of a substantially long rectangular flat plate as a whole. The sandwich member 201 is a molded body having a core material 202 (supported member) inside and formed such that an outer peripheral surface of the core material 202 is covered with a skin material 203. The sandwich member 201 is used, for example, as a structural member, such as a bed panel and luggage compartment board of an automobile.

The core material 202 shown in FIG. 5 is formed in the shape of a long rectangular flat plate and can be formed of a resin to which a foaming agent is added. Examples of the material used for forming the core material 202 include polyolefin, which is a homopolymer or copolymer of olefins, such as ethylene, propylene, butene, isoprenepentene, and methylpentene, polyamide, polystyrene, polyvinyl chloride, acrylic derivatives, such as, polyacrylonitrile and ethylene-ethyl acrylate copolymers, polycarbonate, vinyl acetate copolymers, such as ethylene-vinyl acetate copolymer, ionomers, terpolymers, such as ethylene-propylene-dienes, thermoplastic resins, such as acrylonitrile-styrene copolymer, ABS resin, polyphenylene oxide, polyacetal, thermoplastic polyimide, and thermosetting resins, such as phenol resin, melamine resin, epoxy resin, polyurethane and thermosetting polyimide.

Further, as a foaming agent, any of a physical foaming agent, a chemical foaming agent, and a mixture thereof may be used. As the physical foaming agent, inorganic physical foaming agents, such as air, carbon dioxide gas, nitrogen gas, and water, organic physical foaming agents, such as butane, pentane, hexane, dichloromethane, and dichloroethane, and their supercritical fluids can be used.

The skin material 203 is formed of a polyolefin resin, such as polypropylene, engineering plastic, or the like.

Figure 6:
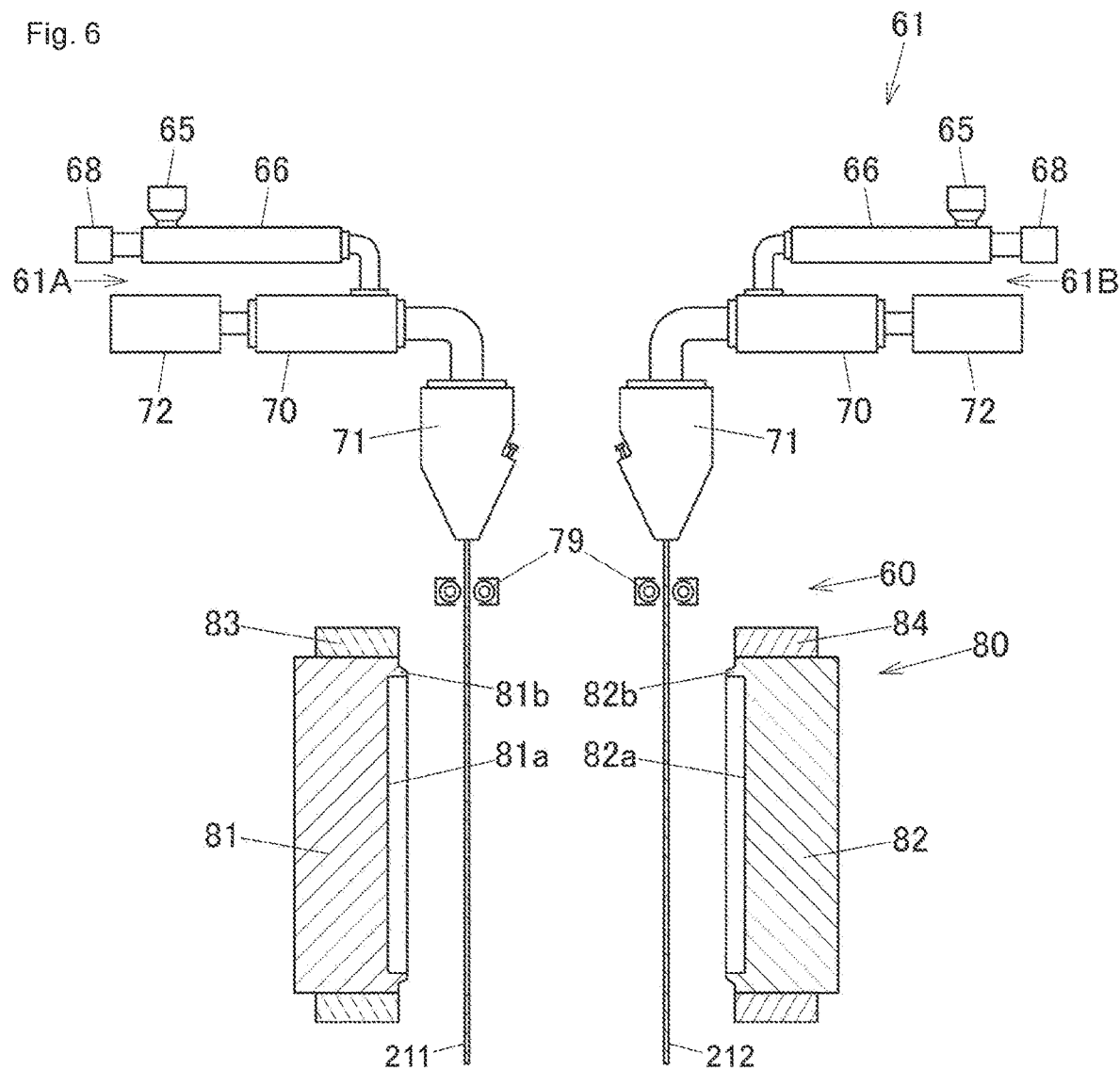
FIG. 6 is a schematic view of a resin molding device according to the embodiment of the second viewpoint of the present invention from a side surface.

FIG. 6 shows the configuration of a resin molding device 60. The sandwich member 201 of the present embodiment is formed by the resin molding device 60 shown in FIG. 6. The resin molding device 60 forms a first molten resin sheet 211 and a second molten resin sheet 212 respectively by two resin supply devices 61 (a first resin supply device 61A, a second resin supply device 61B) arranged so as to face each other. A mold 80 (a first mold 81, a second mold 82) is arranged below the resin supply devices 61.

Each of the resin supply devices 61 includes a hopper 65, which is a supply port for resin material, and an extruder 66 that is connected to a hydraulic motor 68 and melts and kneads the material supplied from the hopper 65 using a screw arranged inside. The extruder 66 is connected to an accumulator 70 including a plunger 72. The melted and kneaded resin material is transferred to the accumulator 70 by the extruder 66. The resin material is pressurized in the accumulator 70 and transferred to a T die 71. Then, a die slit of the T die 71 is opened at a proper timing, and the first molten resin sheet 211 and the second molten resin sheet 212 fed by rollers 79 are formed. The first molten resin sheet 211 and the second molten resin sheet 212 are supplied to the first mold 81 and the second mold 82, respectively.

The first mold 81 and the second mold 82 are arranged to face each other. The outer periphery of the first mold 81 and the second mold 82 is provided with mold frames 83, 84. The first mold 81 is provided with a vacuum pump (not shown) configured to depressurize the space enclosed by a cavity 81a of the first mold 81. Similarly, the second mold 82 is also provided with a vacuum pump (not shown) configured to depressurize the space enclosed by a cavity 82a of the second mold 82.

Figure 7:
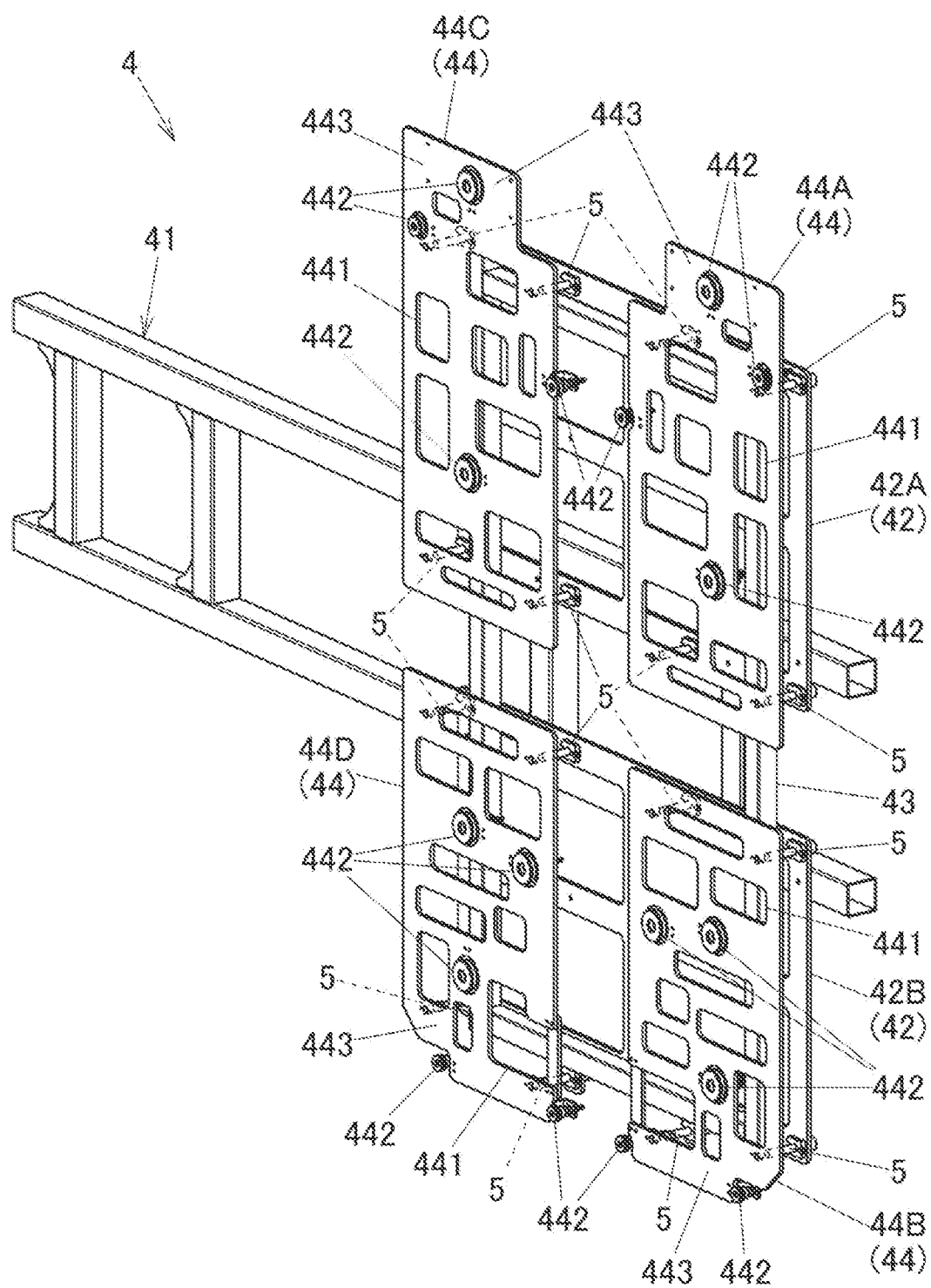
FIG. 7 is a perspective view of a support arm according to the embodiment of the second viewpoint of the present invention from a side of its front surface.
Figure 8:
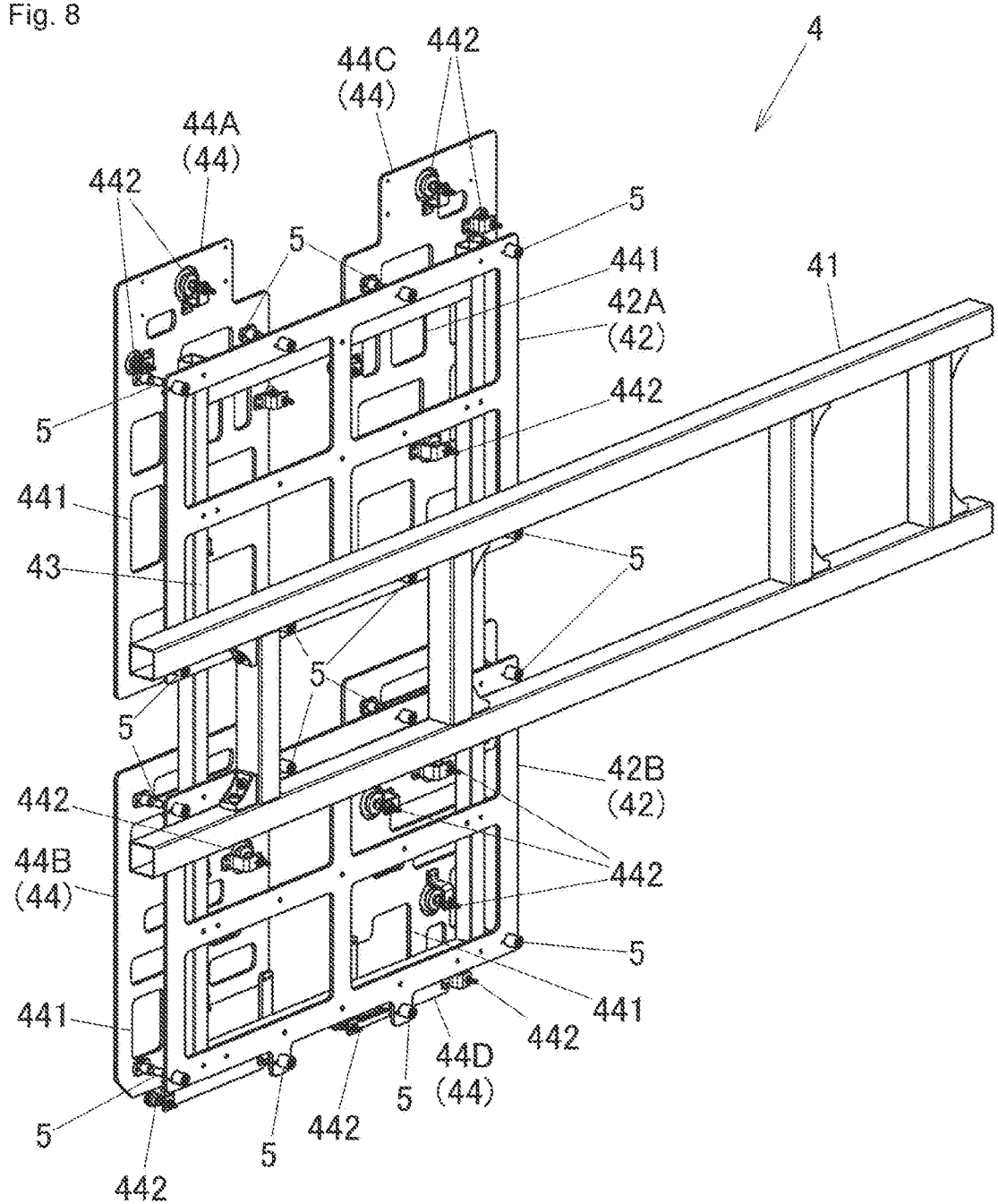
FIG. 8 is a perspective view of the support arm according to the embodiment of the second viewpoint of the present invention from a side of its back surface.

FIG. 7 and FIG. 8 are perspective views of a support arm 4 from a side of its front and back surface, respectively. The support arm 4 includes a cantilever-shaped support beam 41, base plate members 42 connected the front of a free end side of the support beam 41, and a plurality of support bodies 44 connected to a front side of the base plate member 42 via a resilient member 5. In the present embodiment, one core material 202 is supported by a plurality of support bodies 44 to supply the core material 202 to the mold 80.

The support beam 41 is cantilevered and supported on its base end side by a driving portion, such as a robot (not shown). Two base plate members 42 are provided to extend on an upper side and a lower side of the support beam 41, respectively. A base plate member 42A on the upper side and a base plate member 42B on the lower side are connected to a frame member 43 having a square frame shape on the front side (see also FIG. 9). The frame member 43 can increase the overall rigidity of the base plate members 42A, 42B.

In the present embodiment, a total of four support bodies 44 are provided in two rows and two columns in the vertical (up-down) and horizontal (left-right) directions, and include support bodies 44A, 44B (a first support body) and support bodies 44C, 44D (a second support body) that are arranged side by side along an extending direction of the support beam 41 (in other words, the direction from a proximal end side to a free end side). The support bodies 44C, 44D are provided on the proximal end side of the support beam 41 with respect to the support bodies 44A, 44B. Further, the support bodies 44A, 44C are provided on the upper side of the support bodies 44B, 44D.

Each of the support bodies 44 is formed in the shape of a long rectangular flat plate and is connected to and supported by the resilient members 5 at the four corners. Each of the support bodies 44 is urged by the resilient members 5 in a direction away from the support beam 41. When they are pressed from a side of a support surface 443 shown in FIG. 7, each of the support bodies 44 can be independently moved to a side of the support beam 41 against the resilient force of the resilient members 5. Further, an opening 441 and suction portions 442 are formed on the support body 44. The suction portion 442 has a suction surface including a suction port on its front side and can support the core material 202 arranged on a side of the support surface 443 of the support body 44, by negative pressure. The suction portion 442 is connected to a negative pressure source, such as a vacuum pump, via an air hose (not shown). A plurality of suction portions 442 can be provided according to the shape and weight of the core material 202 to be supported. Further, a plurality of suction portions 442 in the present embodiment is formed such that the suction surfaces (first suction surface) of the support bodies 44A, 44B (first support body) and the suction surfaces (second suction surface) of the support bodies 44C, 44D (second support body) are arranged on the same plane.

Figure 9:
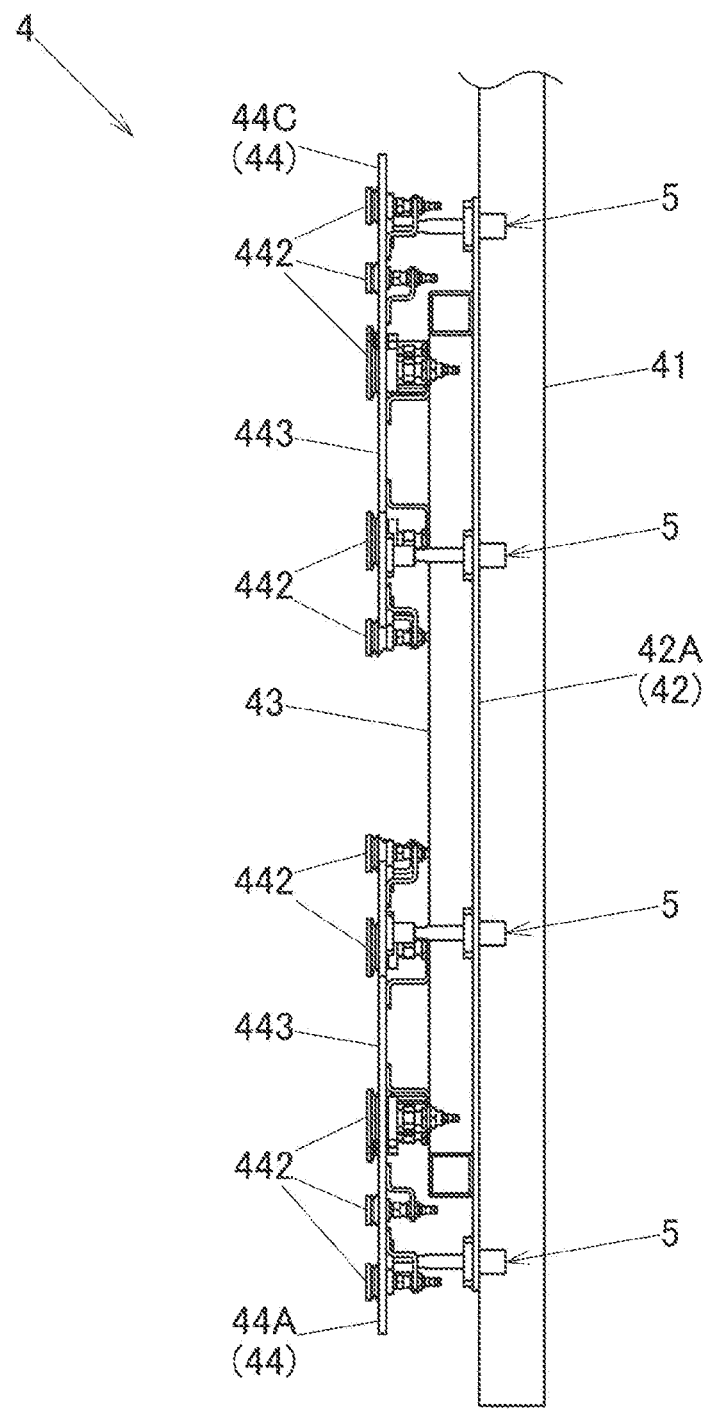
FIG. 9 is a plan view of the support arm according to the embodiment of the second viewpoint of the present invention.
Figure 10A:
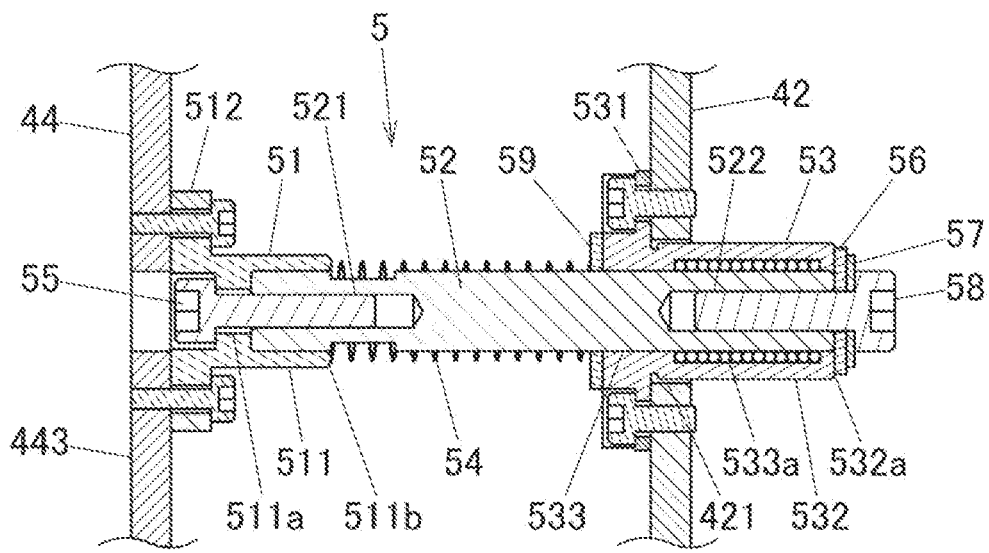
FIG. 10A is a cross-sectional view of a resilient member according to the embodiment of the second viewpoint of the present invention, which are viewed from its top side.

FIG. 10A is a cross-sectional view of the resilient member 5 viewed from the top side in FIG. 9. The resilient member 5 includes a shaft holder 51 fixed to the support body 44, a shaft member 52 fixed to the shaft holder 51, a guide bush 53 through which the shaft member 52 is slidably inserted, and a coil spring 54 configured to resiliently urge the support body 44 in a direction away from the base plate member 42. The shaft holder 51 includes a cylindrical portion 511 accommodating one end of the shaft member 52 and a flange portion 512 bulging radially outward on the other end of the cylindrical portion 511. The shaft holder 51 is fixed to the support body 44 by screwing and fastening with a screw member via an opening provided on the flange portion 512. Further, the shaft holder 51 includes an opening 511a penetrating in an axial direction via the cylindrical portion 511. The shaft member 52 is fixed to the shaft holder 51 by a screw member 55 inserted through the opening 511a into a female screw portion 521 provided on one end side.

The guide bush 53 is formed in a substantially cylindrical shape and is screwed and fastened to be fixed to the base plate member 42 by a screw member inserted through an opening of a flange portion 531 provided on one end side. A cylindrical portion 532 of the guide bush 53 is inserted through an opening 421 formed on the base plate member 42 and protrudes to a side opposite to the support body 44.

A bearing portion 533 corresponding to the outer diameter of the shaft member 52 is formed inside the guide bush 53. The shaft member 52 also has a female screw portion 522 on the other end side, which is opposite to the side provided with the female screw portion 521. A screw member 58 to which washers 56, 57 are jointly fastened is inserted into this female screw portion 522. The washers 56, 57 are formed to have a larger diameter than the bearing portion 533. Therefore, the washers 56, 57 function as a restriction portion for preventing the shaft member 52 from being removed from the guide bush 53. In this regard, the washer 56 provided on a side of the shaft member 52 is formed to have a larger diameter than the washer 57. Further, since a direct-drive ball bearing 533a is provided on an inner peripheral surface of the bearing portion 533, it is possible to reduce wear due to sliding of the shaft member 52 against the bearing portion 533.

Figure 10B:
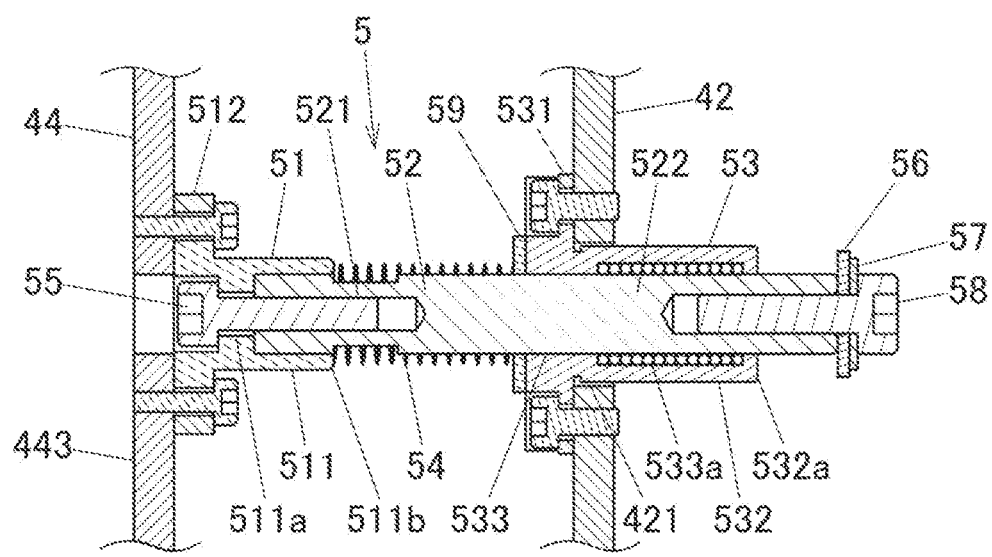
FIG. 10B is a cross-sectional view of a resilient member according to the embodiment of the second viewpoint of the present invention, which are viewed from its top side.

A washer 59 is provided around the outer periphery of the shaft member 52 on a side of the support body 44 with respect to the flange portion 531. Further, the shaft member 52 is formed to have an outer diameter smaller than the outer diameter of the cylindrical portion 511. One end side of the coil spring 54 abuts against an end portion 511b of the cylindrical portion 511 of the shaft holder 51, and the other end side abuts against the washer 59. As shown in FIG. 10A and FIG. 10B, in a state where the movement of the support body 44 to a side of the support surface 443 is restricted by the washers 56, 57, the coil spring 54 is accommodated in a compressed state.

FIG. 10B shows a state in which the support body 44 is pressed to a side of the base plate member 42 and the shaft member 52 slides inside the bearing portion 533. The support body 44 can move together with the shaft member 52 relative to the base plate member 42 against the resilient force of the coil spring 54. When the pressing force applied to the support body 44 to a side of the base plate member 42 is released, the support body 44 moves together with the shaft member 52 in a direction away from the base plate member 42. When the washer 56 abuts against an end portion 532a of the cylindrical portion 532, the movement of the support body 44 is restricted. The washer 56 of the present embodiment is made of urethane and can function as a cushioning material.

The resilient force of each of the resilient members 5 shown in FIG. 7 and FIG. 8 can be set differently depending on a plurality of support bodies 44A~44D. For example, the resilient force of the resilient members 5 for the support bodies 44A, 44B (first support body) provided on the distal end side (the free end side) of the support beam 41 are set larger than the resilient force of the resilient members 5 for the support bodies 44C, 44D (second support body) provided on the proximal end side of the support beam 41. In this regard, the resilient force of the resilient members 5 may be set to gradually increase from the proximal end side to the distal end side of the support beam 41 within each of the support bodies 44A to 44D. Further, the resilient force of the resilient members 5 may be set to substantially the same, or the resilient force may be set so that, in some parts, there are a portion to which the larger resilient force is applied and a portion to which the smaller resilient force is applied.

Next, a manufacturing method of the sandwich member 201 will be described. First, in a material supply step, the resin supply device 61 in FIG. 5 hangs down and arranges the first molten resin sheet 211 and the second molten resin sheet 212 between the first mold 81 and the second mold 82.

Figure 11A:
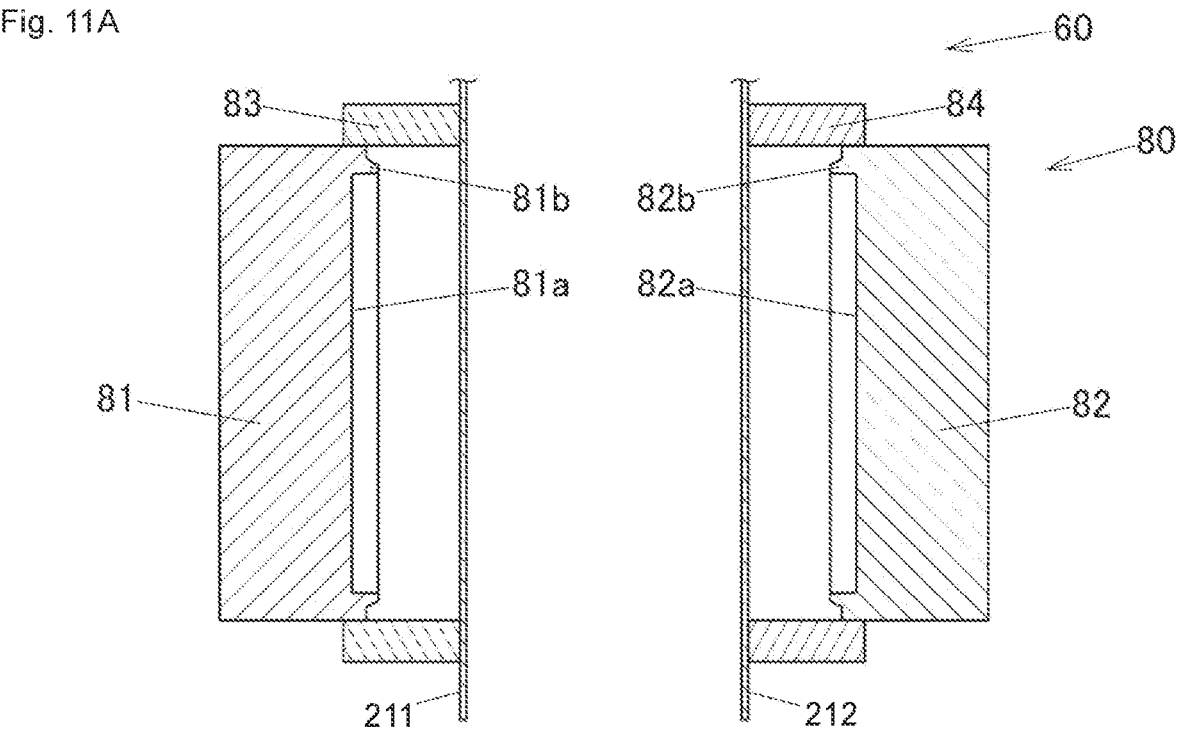
FIG. 11A shows a manufacturing method of a molded body according to the embodiment of the second viewpoint of the present invention in which mold frames abut against molten resin sheets.
Figure 11B:
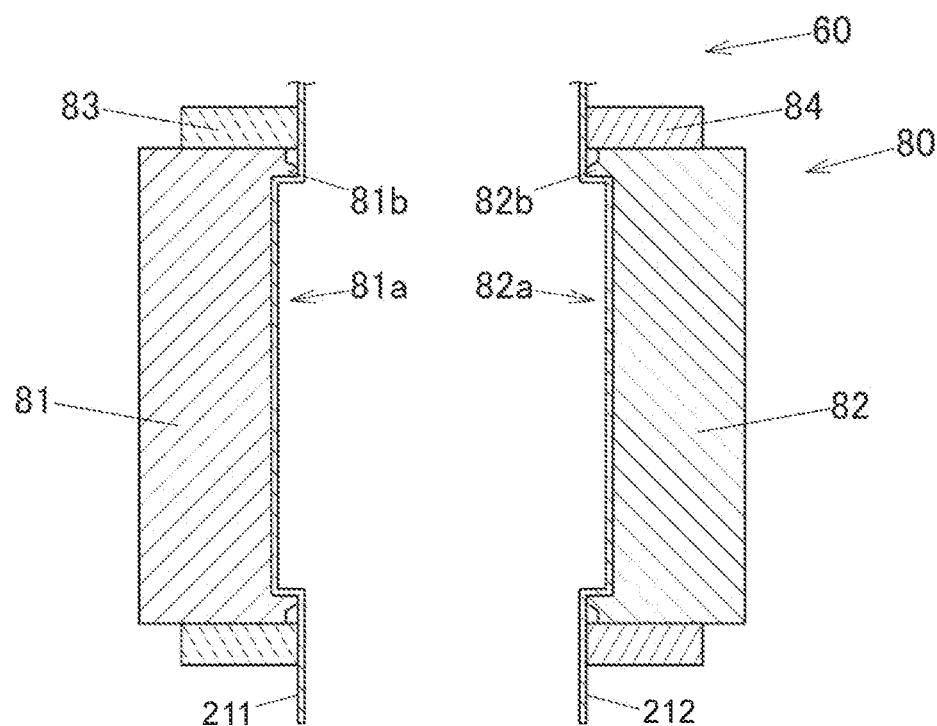
FIG. 11B shows a manufacturing method of a molded body according to the embodiment of the second viewpoint of the present invention in which the molten resin sheets are shaped in molds.

In a shaping step, the mold frame 83 is moved toward the first molten resin sheet 211 to abut against a sheet surface of the first molten resin sheet 211 (see FIG. 11A). Then, the mold frame 83 and the first mold 81 are brought relatively closer to each other, and the space defined by the first molten resin sheet 211, the cavity 81a, and the mold frame 83 is depressurized, so that the first molten resin sheet 211 is shaped by the cavity 81a (see FIG. 11B).

Similarly, on a side of the second mold 82 facing the first mold 81, the mold frame 84 is moved toward the second molten resin sheet 212 to abut against a sheet surface of the second molten resin sheet 212 (see FIG. 11A). Then, the mold frame 84 and the second mold 82 are brought relatively closer to each other, and the space defined by the second molten resin sheet 212, the cavity 82a, and the mold frame 83 is depressurized, so that the second molten resin sheet 212 is shaped by the cavity 82a (see FIG. 11B).

Figure 12A:
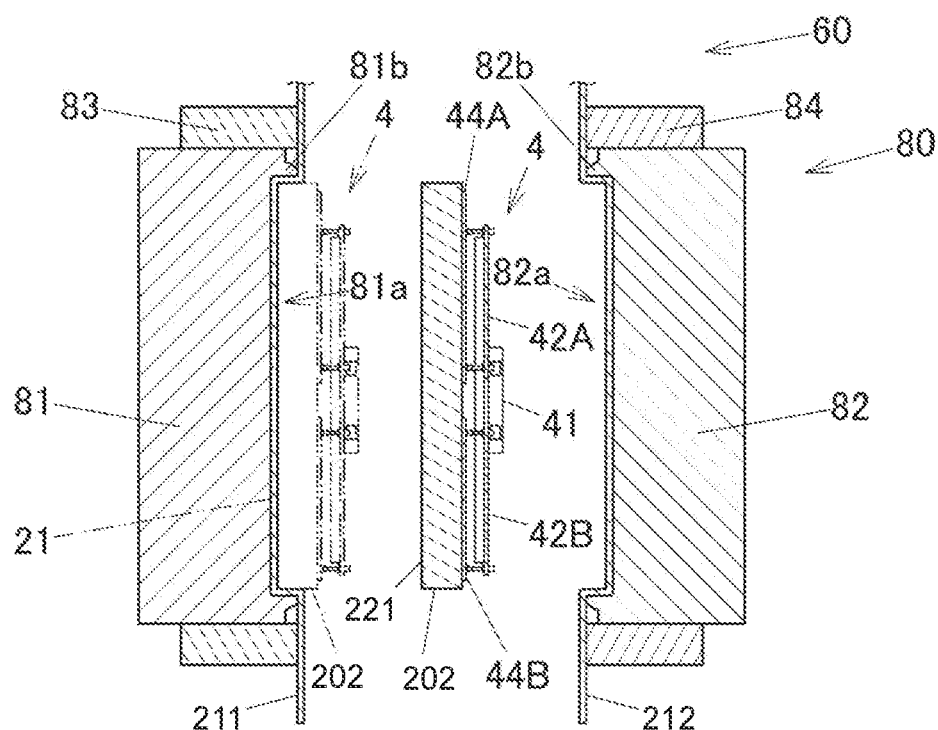
FIG. 12A shows the manufacturing method of the molded body according to the embodiment of the second viewpoint of the present invention in which a core material is arranged between the molten resin sheets.

In a transfer step of the core material, during the period from the material supply step to the shaping step, the core material 202 supported by the support arm 4 is arranged between the first mold 81 and the second mold 82 that have shaped the first molten resin sheet 211 and the second molten resin sheet 212 (see FIG. 12A). The core material 202 is supported by negative pressure received from a side of each of the support surfaces 443 of the support bodies 44. Then, the support arm 4 is moved toward the cavity 81a of the first mold 81, which is one of the molds, and the core material 202 is inserted thereto (see the two-dot chain line in FIG. 12A).

Figure 13:
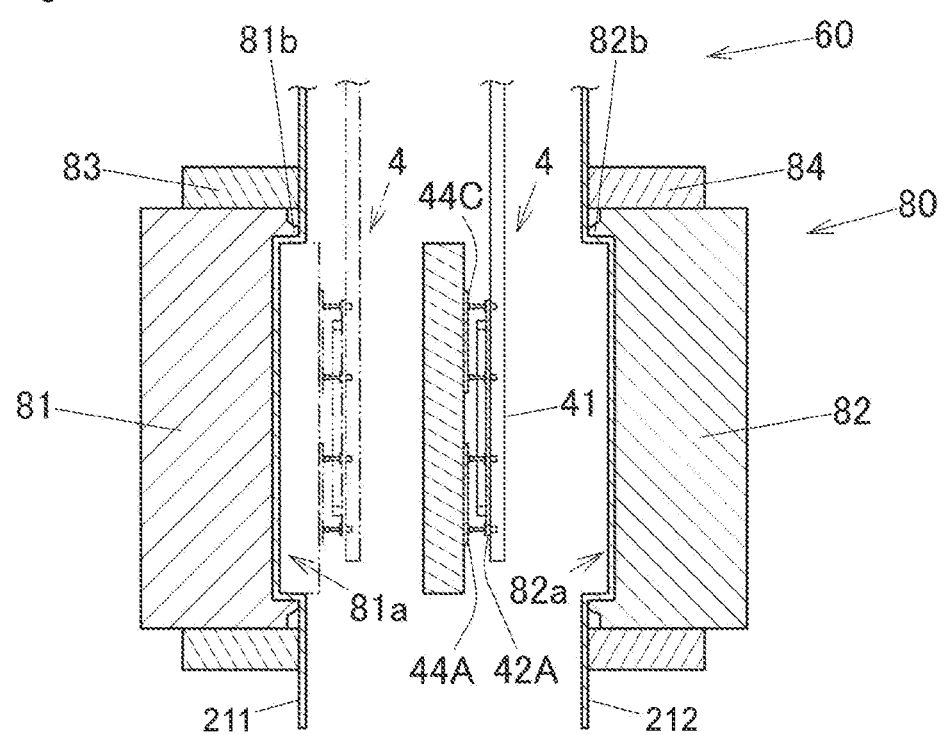
FIG. 13 is a plan schematic view of the state of FIG. 12A in the manufacturing method of the molded body according to the embodiment of the second viewpoint of the present invention.

In a specific operation example, the support arm 4 moves from the proximal end side to the distal end side of the support beam 41 (from the upper side to the lower side in FIG. 13) between the first mold 81 and the second mold 82, and then moves in a direction substantially perpendicular to the sheet surface of the first molten resin sheet 211 shaped by the cavity 81a. At this time, even if a facing surface 221 of the core material 202 supported by the support arm 4, which faces the first molten resin sheet 211, is tilted with respect to the first molten resin sheet 211 or the cavity 81a, the posture of the core material 202 as the supported member is corrected within a movable range of the support body 44 by the resilient member 5, so that the first molten resin sheet 211 and the facing surface 221 of the core material 202 can be reliably brought into contact with each other.

The facing surface 221 of the core material 202 in contact with the first molten resin sheet melts at a portion in contact with the first molten resin sheet 211 in a high temperature state, and the core material 202 and the first molten resin sheet 211 are connected by welding. In the present embodiment, the resilient force of the support bodies 44A, 44B (first support body) provided on the distal end side (free end side) of the support beam 41 against the support beam 41 and the base plate member 42 is set larger than the resilient force of the support bodies 44C, 44D (second support body) provided on the proximal end side of the support beam 41 against the support beam 41 and the base plate member 42. Consequently, even when the support beam 41 is bent, it is possible to prevent the pressing force applied to the core material 202 on the distal end side of the support beam 41 from being relatively reduced and to reduce welding defects of the core material 202.

After the core material 202 is welded to the first molten resin sheet 211, the negative pressure of the support bodies 44 is reduced, and the support arm 4 releases the support of the core material 202. Then, the support arm 4 that has finished the transfer of the core material 202 is moved and retracted from between the first mold 81 and the second mold 82.

Figure 12B:
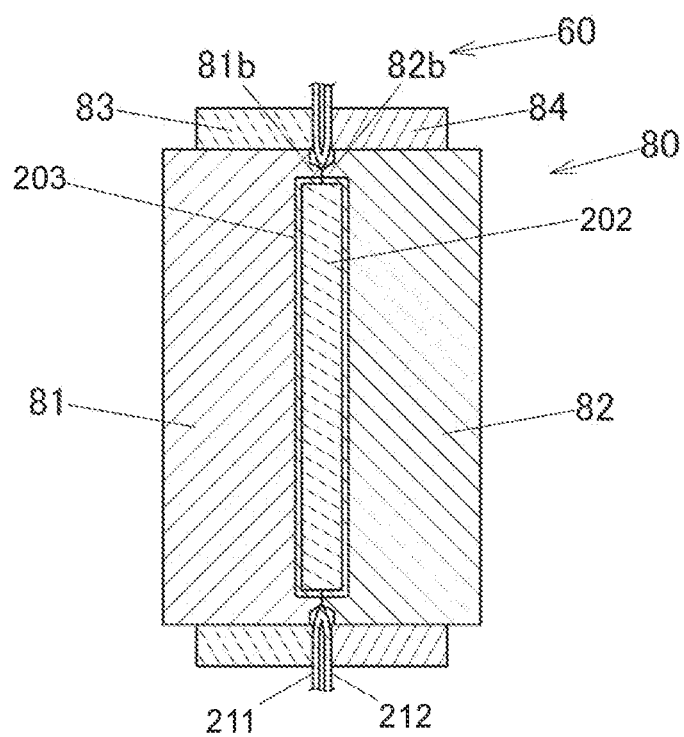
FIG. 12B shows the manufacturing method of the molded body according to the embodiment of the second viewpoint of the present invention in which a first mold and a second mold are clamped.

In a mold clamping step, in a state where the first molten resin sheet 211 is shaped in the cavity 81a of the first mold 81, the first mold 81 into which the core material 202 is inserted and the second mold 82 relatively approach each other and are clamped so that annular pinch-off portions 81b, 82b abut against each other (see FIG. 12B). The first molten resin sheet 211 and the second molten resin sheet 212 are welded to each other along the pinch-off portions 81b, 82b on the outer peripheral edge so as to sandwich the core material 202 and are formed as the skin material 203. The core material 202 is melted and welded at the portion where the core material 202 and the second molten resin sheet 212 are in contact with each other. Consequently, the sandwich member 201 in which the core material 202 is covered with the first molten resin sheet 211 and the second molten resin sheet 212 is formed.

Then, in a removal step, the first mold 81 and the second mold 82 are opened, and the molded sandwich member 201 is removed from the first mold 81 and the second mold 82.

In the present embodiment, the support body 44 is supported by the resilient member 5 so as to resiliently urge the support beam 41. In this regard, instead of the resilient member 5, another moving member supporting the support body 44 so that it can move with respect to the support beam 41 by sliding movement or the like may be provided. When the support body 44 is pressed toward the side of the base plate member 42, the moving member moves the support body 44 relatively in a direction closer to the base plate member 42, and when the pressing force applied to the support body 44 toward the base plate member 42 is released or reduced, the moving member can move the support body 44 in a direction away from the side of the base plate member 42. The moving member can be configured to resiliently urge the support body 44 in the direction away from the support beam 41 or can be configured to actively or passively move a part or all of the support bodies 44A to 44D to which the pressing force higher than the predetermined level is applied toward the support beam 41. The amount of movement of the support bodies 44A to 44D is set according to the balance of the pressing force, and the posture of the core material 202 can be corrected within the movable range of the support bodies 44A to 44D by the moving member. Even in this case, the pressing force (reaction force) of the support body 44 on the distal end side of the support beam 41 applied to the core material 202 can be set larger than the pressing force (reaction force) of the support body 44 on the proximal end side of the support beam 41 applied to the core material 202.

Further, the support bodies 44A, 44B (first support body) provided on the distal end side (free end side) of the support beam 41 may be fixed to the support beam 41 so as not to move, and the support bodies 44C, 44D (second support body) provided on the proximal end side of the support beam 41 may be configured to be movable with respect to the support beam 41.

As described above, in the present embodiment, the support arm 4 including the support bodies 44A, 44B (first support body) supporting the supported body on the distal end side of the support beam 41 and the support bodies 44C, 44D (second support body) provided to be movable with respect to the support beam 41 on the proximal end side of the support beam 41 and supporting the supported body, and the supporting method of the supported body were described. Consequently, at a portion of the supported body where the reaction force applied from the molten resin sheet is large, the corresponding support body 44 moves flexibly in the direction away from the molten resin sheet. On the other hand, at a portion of the supported body where the reaction force is relatively small, the corresponding support body 44 does not move or its movement amount is small. Thus, the surface pressure between the molten resin sheet and the supported body is corrected to distribute uniformly. Therefore, the weldability between the supported body and the molten resin sheet is improved, and the supported member can be stably supplied.

The embodiment of the present invention is described above, and the present invention is not limited to the embodiment and can be implemented with various modifications. For example, although the support bodies 44 are arranged in two rows and two columns along the extending direction of the support beam 41 and the direction perpendicular to the extending direction in the present embodiment, a plurality of support bodies may be arranged only along the extending direction of the support beam 41. Alternatively, the support bodies 44 may be arranged at three or more points along the extending direction of the support beam 41 and may be arranged at three or more points along the direction perpendicular to the extending direction of the support beam 41.

Third Viewpoint

Figure 14:
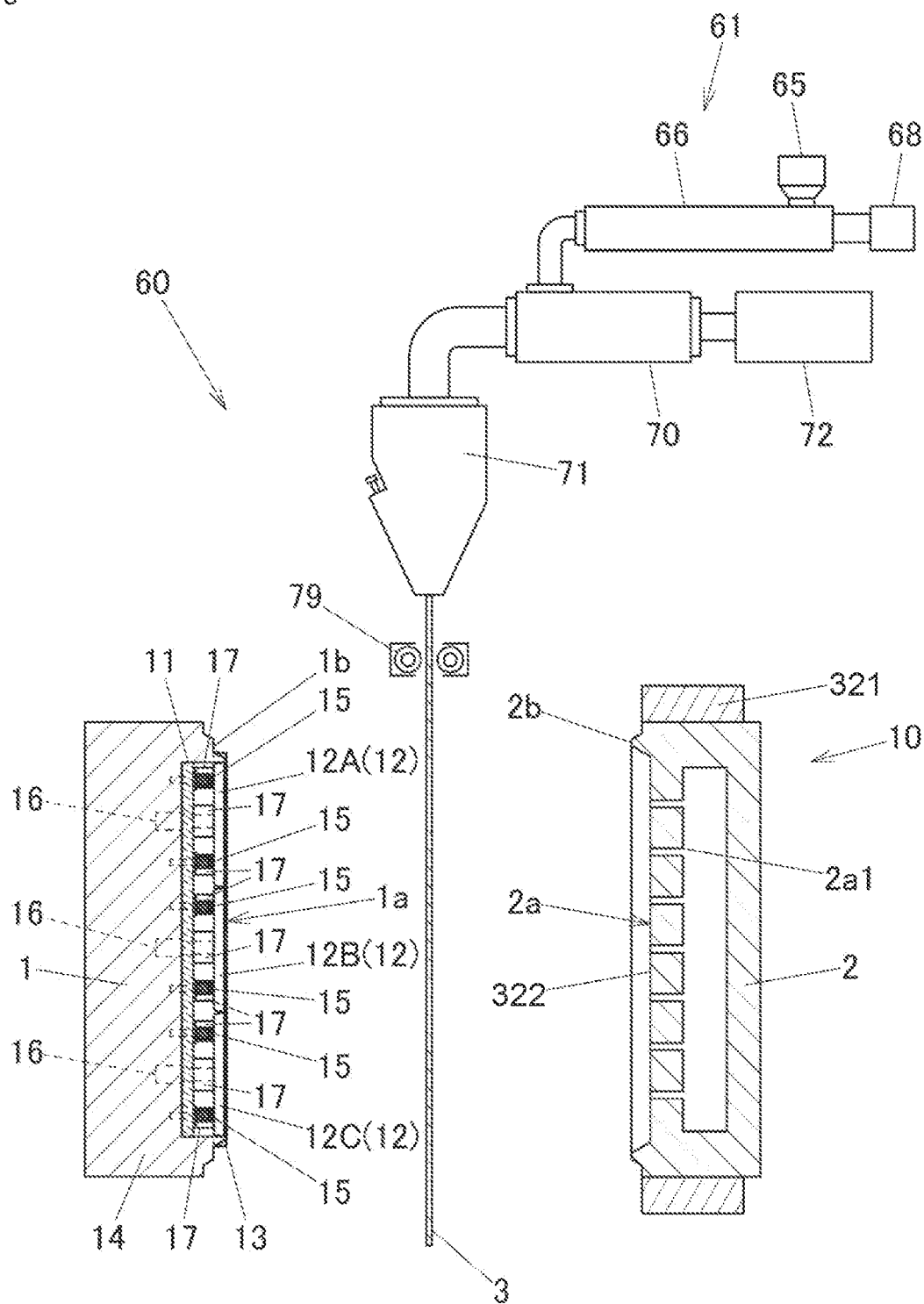
FIG. 14 is a schematic view of a resin molding device according to an embodiment of the third viewpoint of the present invention.

Next, an embodiment of the present invention will be described with reference to the drawings. FIG. 14 shows a resin molding device 60 of the present embodiment. The resin molding device 60 molds a molten resin sheet 3, which is a sheet-shaped resin material, using the resin supply device 61. The molten resin sheet 3 can be formed of polyolefin resin, such as polypropylene, engineering plastic, or the like. A mold 10 (a first mold 1, a second mold 2) is arranged below the resin supply device 61.

The resin supply device 61 includes a hopper 65 used as a supply port of the resin material and an extruder 66 that is connected to a hydraulic motor 68 and configured to melt and knead the material supplied from the hopper 65 using a screw arranged in inside. An extruder 66 is connected to an accumulator 70 including a plunger 72. The melted and kneaded resin material is transferred to the accumulator 70 by the extruder 66. The resin material is pressurized in the accumulator 70 and transferred to a T die 71. Then, a die slit of the T die 71 is opened at a proper timing, and the molten resin sheet 3 fed by the rollers 79 is formed.

The first mold 1 and the second mold 2 are arranged to face each other. In the present embodiment, the first mold 1 and the second mold 2 has a convex shape and a concave shape, respectively. A core 1a including a slide portion 12 and a fixing portion 13 described below is formed on the first mold 1. A cavity 2a corresponding to the core 1a is formed on the second mold 2, and a vacuum pump (not shown) is provided to suck and depressurize the space surrounded by the cavity 2a through suction holes 2a1. Further, the outer periphery of the second mold 2 is provided with a mold frame 321.

Figure 15:
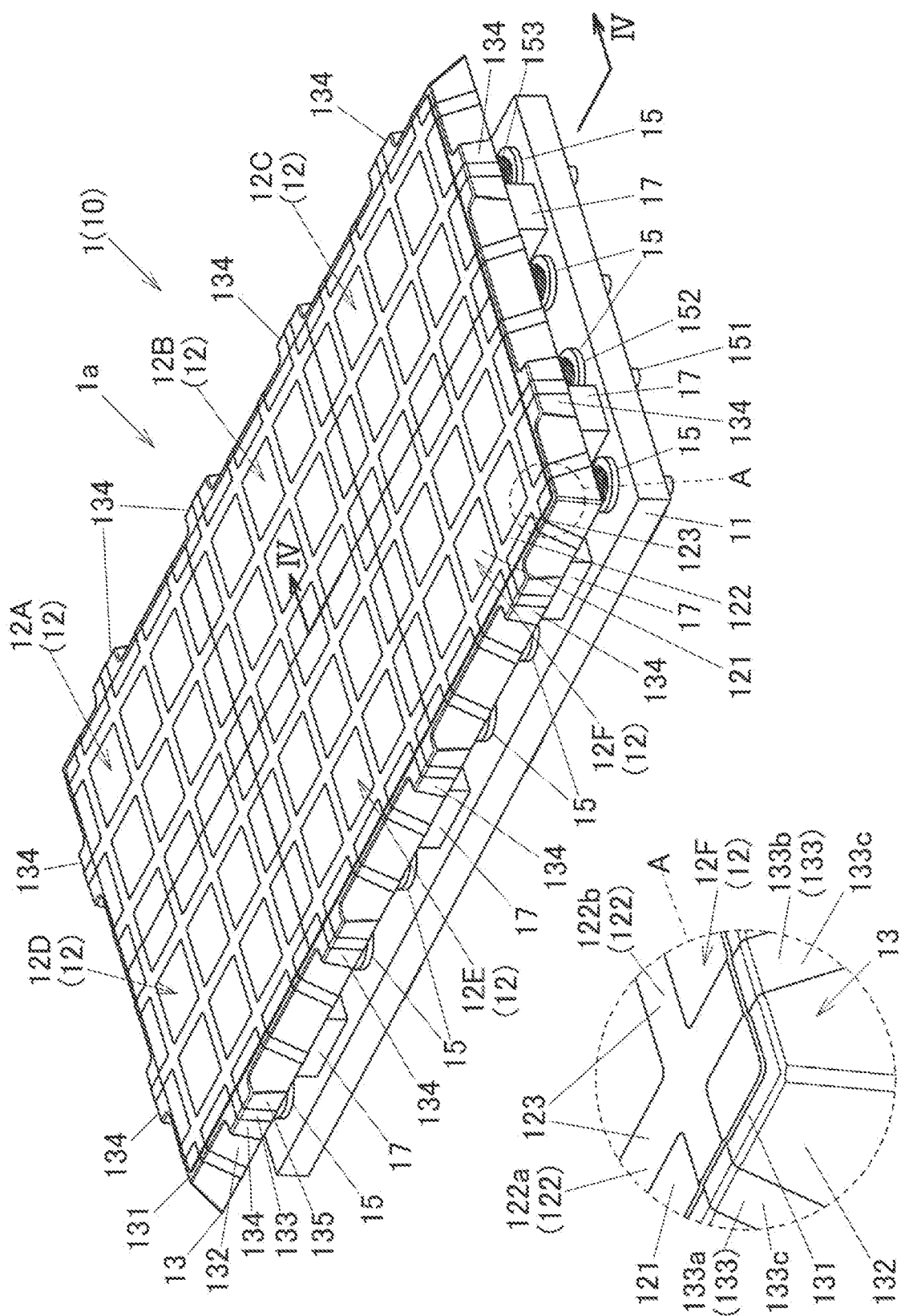
FIG. 15 is a perspective view showing a part of a first mold according to the embodiment of the third viewpoint of the present invention.
Figure 16:
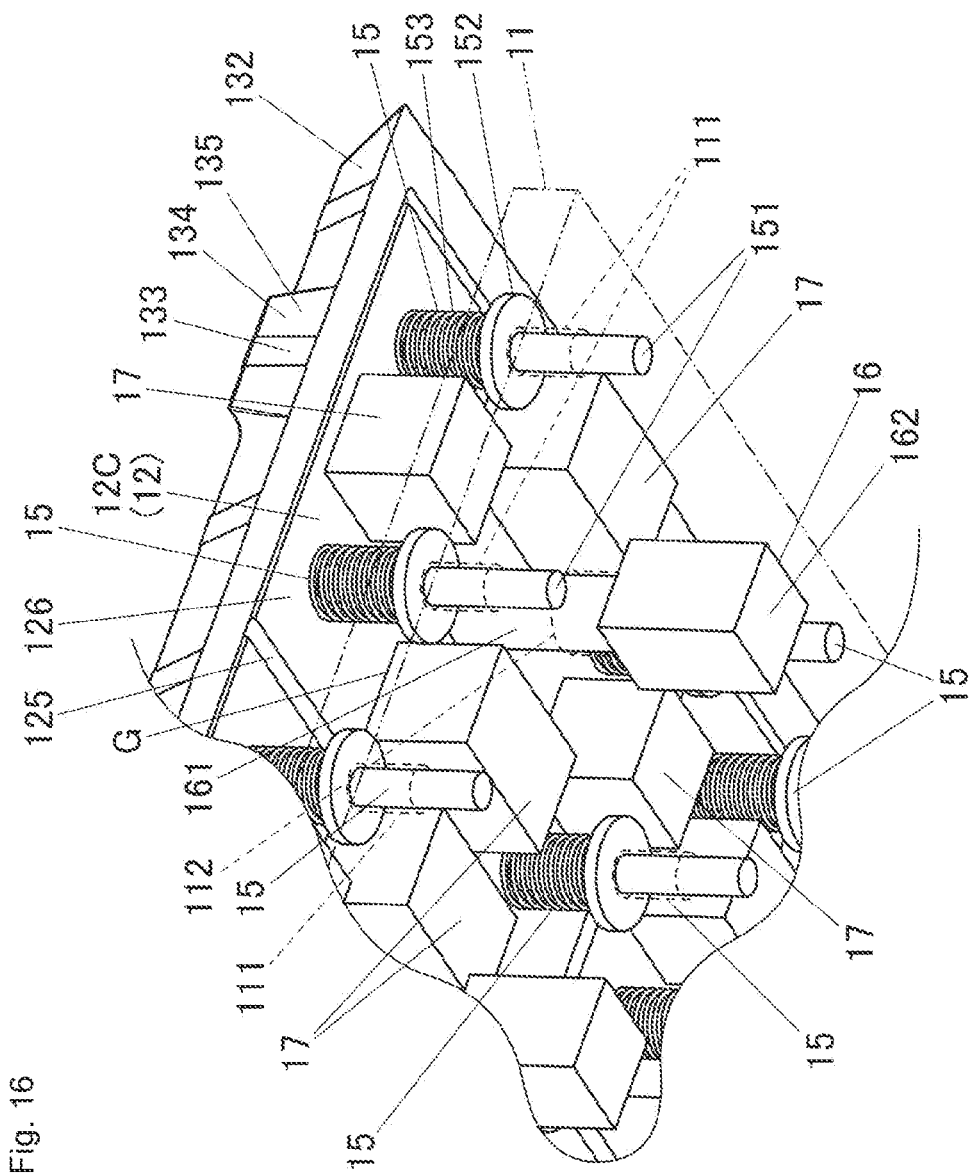
FIG. 16 is an enlarged perspective view of the first mold shown in FIG. 15 from its back side according to the embodiment of the third viewpoint of the present invention.
Figure 17:
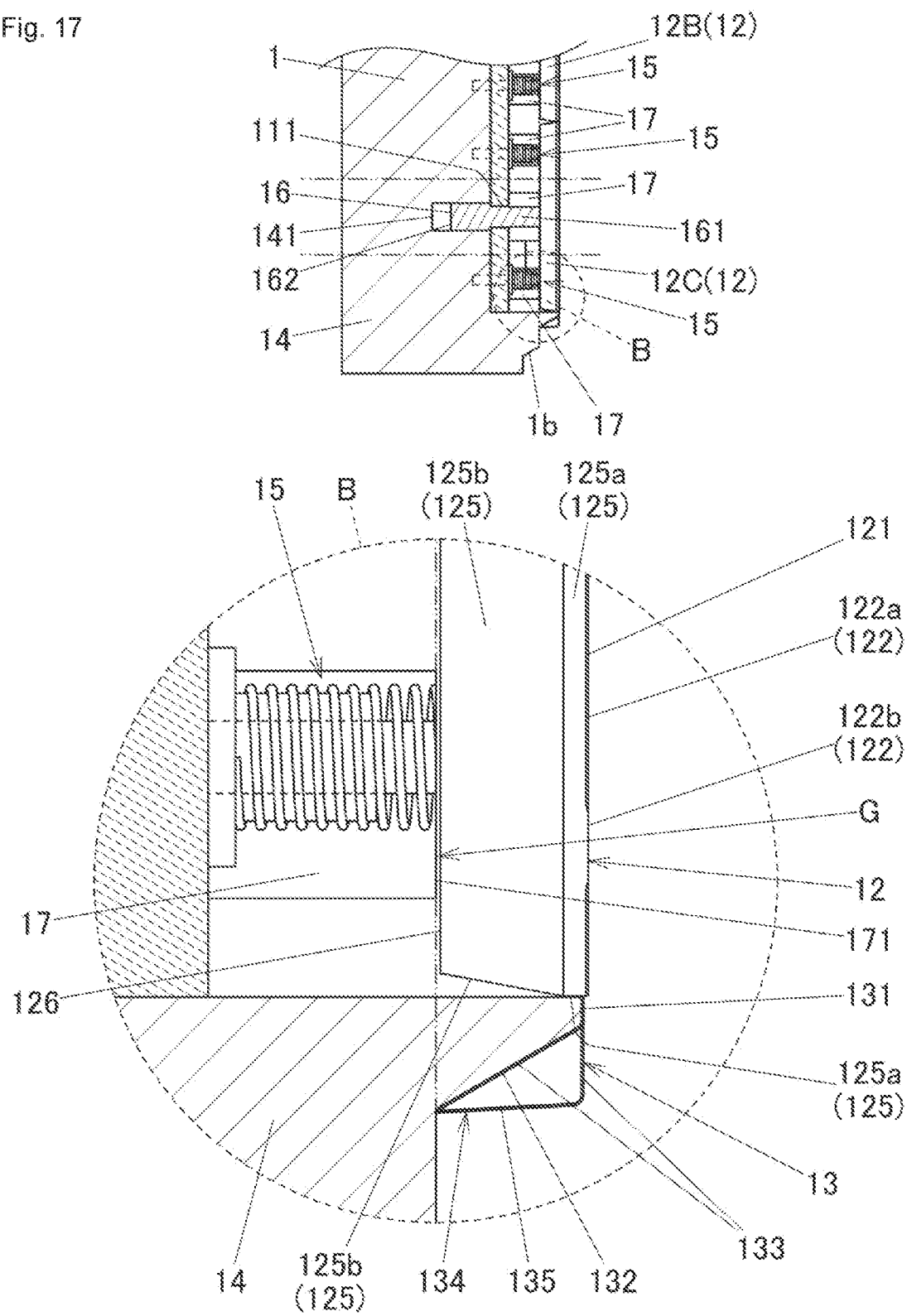
FIG. 17 is a combined cross-sectional view in which a cross section of a second restriction portion is combined to a cross section of the first mold taken along a line IV-IV in FIG. 15, according to the embodiment of the third viewpoint of the present invention.

FIG. 15 is a perspective view showing a part of the first mold 1. FIG. 16 is an enlarged perspective view of the first mold 1 shown in FIG. 15 from its back side. Further, FIG. 17 is a combined cross-sectional view in which a cross section of a first restriction portion 16 is combined to a cross section of the first mold 1 taken along a line IV-IV in FIG. 15. The first mold 1 includes a plurality of slide portions 12 movable relative to a plate-shaped base portion 11 and the fixing portion 13 arranged to surround the outer periphery of a plurality of slide portions 12. The base portion 11 is fixed to a moving mold 14 shown in FIG. 14. Further, while the fixing portion 13 in the present embodiment is configured as a part of the moving mold 14, as shown in FIG. 14 (the chain line in FIG. 17 shows a virtual line of the boundary between the fixing portion 13 and the moving mold 14), it may be configured separately from the moving mold 14.

The slide portion 12 is formed in a rectangular flat plate shape, and a plurality of slide portions is arranged in a matrix of two rows and three columns. The slide portion 12 includes a substantially flat abutting surface 121 (a first abutting surface) and a projecting portion 122 formed on the abutting surface 121. A flat projecting surface 123 having a predetermined width and substantially parallel to the abutting surface 121 is formed on the projecting portion 122. As shown in the enlarged view of a portion A in FIG. 15, the projecting portion 122 includes a first projecting portion 122a extending in a first direction in which three slide portions 12 are consecutively provided and a second projecting portion 122b extending in a second direction in which two slide portions 12 are consecutively provided. A plurality of first projecting portions 122a and a plurality of second projecting portions 122b are linearly arranged at substantially equal intervals and are formed so as to be orthogonal to (intersect with) each other. The projecting portions 122 of the present embodiment are formed in a substantially lattice shape over the entire abutting surface 121.

The width of the projecting surface 123 is formed to be shorter than the width of the abutting surface 121. For example, the width of a plurality of projecting surfaces 123 shown in FIG. 15 may be 15 mm while the pitches of the projecting surfaces 123 in the first direction and the second direction may be 80 mm or 40 mm (that is, the width of each of the abutting surfaces 121 may be 65 mm or 25 mm).

The height of the projecting surface 123 (the distance from the abutting surface 121 to the projecting surface 123) protrudes with a dimension smaller than the wall thickness of the molten resin sheet 3, and for example, the wall thickness of the molten resin sheet 3 may be 2 to 3 mm while the height of the projecting surface 123 may be set to 0.5 mm. The height of the projecting surface 123 from the abutting surface 121 is set, depending on the characteristics of the molten resin sheet 3, such as fluidity (MFR, Melt Flow rate), such that the molten resin sheet 3 does not come into contact with the abutting surface 121 at the initial first timing at which the first mold 1 abuts against the molten resin sheet 3 in a mold clamping step described below, and such that the molten resin sheet comes into contact with the abutting surface 121 at the second timing after the first timing by the mold clamping force between the first mold 1 and the second mold 2. Consequently, it is possible to quickly start cooling a portion of the molten resin sheet 3 corresponding to the projecting surface 123 and to shorten the cooling time of the molten resin sheet 3 as a whole by subsequent contact with the abutting surface 121.

As shown in the enlarged view of a portion B in FIG. 17, a side surface 125 surrounding the four sides of each of the slide portions 12 includes a parallel surface 125a parallel to the moving direction of the slide portion 12 and an inclined surface 125b consecutively connected to the parallel surface 125a. The parallel surface 125a is provided on a side of the abutting surface 121, and the inclined surface 125b is provided on a side of a back surface 126 (on a side of the base portion 11). The inclined surface 125b is formed to be wider than the parallel surface 125a in a plate thickness direction of the slide portion 12. Therefore, the slide portion 12 is formed in the shape of a thin plate of a truncated pyramid tapered as a whole toward the side of the base portion 11.

The slide portion 12 is supported by a resilient portion 15 and the first restriction portion 16 on a side of the back surface 126 where the base portion 11 is provided (see FIG. 16 and FIG. 17 and the like). The slide portion 12 is resiliently urged from the side of the base portion 11 to a side of the second mold 2, and the movable range to the side of the base portion 11 and to the side of the second mold 2 is restricted at a predetermined position by the first restriction portion 16.

The resilient portions 15 are arranged at four points corresponding to the four corners of the slide portion 12 in a plan view. The resilient portion 15 includes a shaft 151 provided to stand upright from the slide portion 12 toward the base portion 11, a bush 152 fixed to the side of the base portion 11, and a compression coil spring 153 wound around the outer periphery of the bush 152 into which the shaft 151 is inserted. The shaft 151 is slidably inserted into a bearing 111 of the base portion 11 via the bush 152. The compression coil spring 153 resiliently urges the slide portion 12 and the base portion 11 in a direction away from each other, so that the slide portion 12 is urged to a side of the abutting surface 121 (in other words, to the side of the second mold 2).

The first restriction portion 16 restricts the movement of the slide portion 12 to a side of the abutting surface 121. The first restriction portion 16 is arranged corresponding to a substantially central position of the slide portion 12 in a plan view. The first restriction portion 16 includes a columnar supporting shaft portion 161 that stands upright from the back surface 126 of the slide portion 12 and an enlarged portion 162 of a square columnar shape formed on an end portion side of the supporting shaft portion 161. The supporting shaft portion 161 is slidably inserted into a bearing 112 which is a through hole provided on the base portion 11. The enlarged portion 162 is formed to have a diameter larger than that of the supporting shaft portion 161 and the bearing 112 and is arranged in a slide space 141 on a side of the moving mold 14 (see FIG. 17). Therefore, the enlarged portion 162 abuts against the peripheral edge of the bearing 112, so that the slide portion 12 is restricted from moving in the direction away from the base portion 11.

Further, the base portion 11 is provided with a second restriction portion 17 of a square columnar shape that stands upright toward a side of the slide portion 12. The second restriction portions 17 are arranged at four points corresponding to the four sides of the slide portion 12 in a plan view. As shown in the enlarged view of the portion B in FIG. 17, an end surface 171 of each of the second restriction portions 17 is separated from the back surface 126 of the slide portion 12 by a predetermined gap G in a state where the slide portion 12 is urged to the side of the abutting surface 121 (the side of the second mold 2). When the slide portion 12 is pressed to the side of the base portion 11, the end surface 171 of the second restriction portion 17 abuts against the back surface 126 of the slide portion 12, so that the movement of the slide portion 12 to the side of the base portion 11 is restricted. The movable width of the slide portion 12 (the maximum value of the gap G) is set to, for example, 1 mm.

Returning to FIG. 15, the fixing portion 13 is formed in a rectangular annular shape and arranged adjacent to the outer periphery of a plurality of slide portions 12. The fixing portion 13 includes an abutting surface 131 (a third abutting surface) which is a flat surface substantially parallel to the abutting surface 121 of the slide portion 12 and a side surface 132 which is an inclined surface consecutively provided from the abutting surface 131. A plurality of projecting wall portions 134 is provided to project from the side surface 132 at predetermined intervals. The projecting wall portion 134 projects outward in a plan view, and the abutting surface 131 extends to a side of the projecting wall portion 134. The side surface 135 of the projecting wall portion 134 is formed at a steeper angle than the side surface 132. On the side surface 132 and the projecting wall portion 134, a third projecting portion 133a and a fourth projecting portion 133b are provided consecutively in an extending direction of the first projecting portion 122a or the second projecting portion 122b provided on the slide portion 12. The height of a projecting surface of the third projecting portion 133a and the fourth projecting portion 133b from the abutting surface 131 is substantially the same as the height of the projecting surface 123 of the first projecting portion 122a and the second projecting portion 122b from the abutting surface 121. Further, the third projecting portion 133a and the fourth projecting portion 133b are formed to have the same width as the first projecting portion 122a and the second projecting portion 122b. The step height between the abutting surface 121 and the abutting surface 131 in a state where the slide portion 12 is urged to the side of the second mold 2 can be set larger than the height of the projecting surfaces 123, 133c from the abutting surfaces 121, 131.

On the cavity 2a of the second mold 2, an abutting surface 322 (a second abutting surface) having a shape corresponding to the abutting surface 121 of the facing first mold 1 is formed. The abutting surface 322 in the present embodiment is formed as a flat surface substantially parallel to the abutting surface 121. For example, if the abutting surface 121 of the first mold 1 has a curved surface or an inclined surface, the abutting surface 322 of the facing second mold 2 can be a curved surface or an inclined surface corresponding to the abutting surface 121.

Next, a manufacturing method of a molded body 305 will be described. The molded body 305 manufactured in the present embodiment (see FIG. 18A and FIG. 18B) is manufactured by the resin molding device 60 shown in FIG. 14 and the like. First, in a material supply step, the resin supply device 61 hangs down and supplies the molten resin sheet 3 to arrange between the first mold 1 and the second mold 2 (see FIG. 14).

Figure 18A:
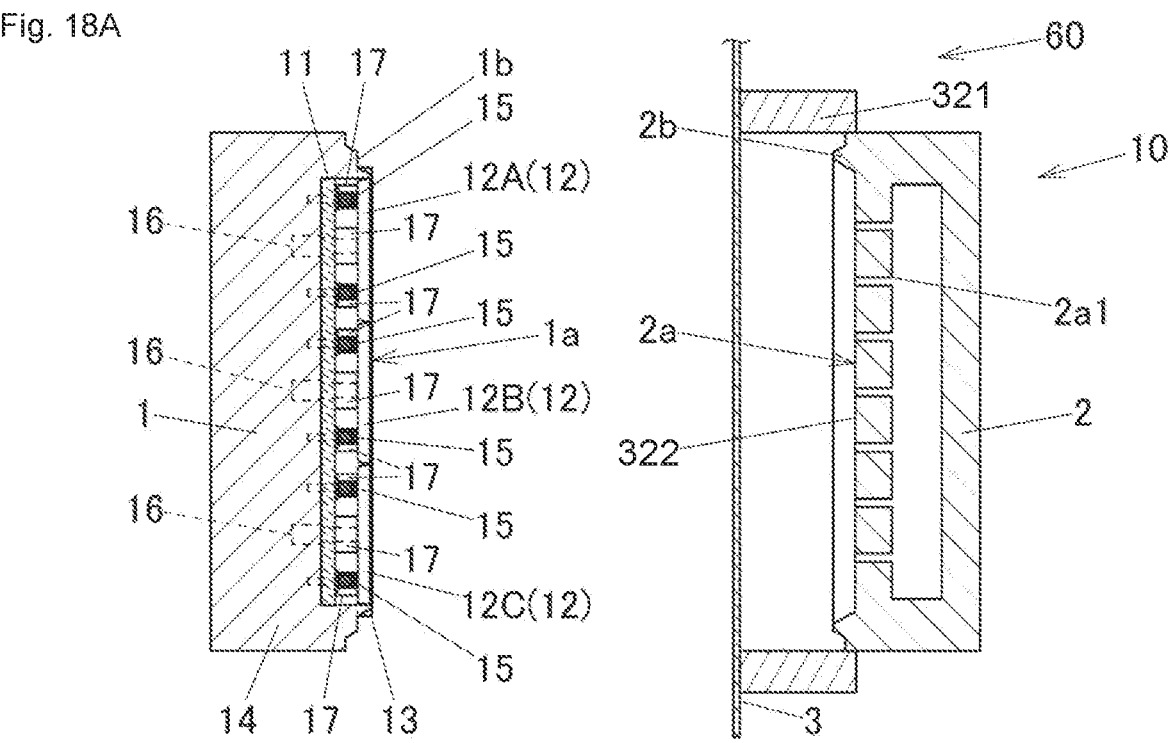
FIG. 18A shows a manufacturing method of a molded body according to the embodiment of the third viewpoint of the present invention in which a mold frame abuts against a molten resin sheet.
Figure 18B:
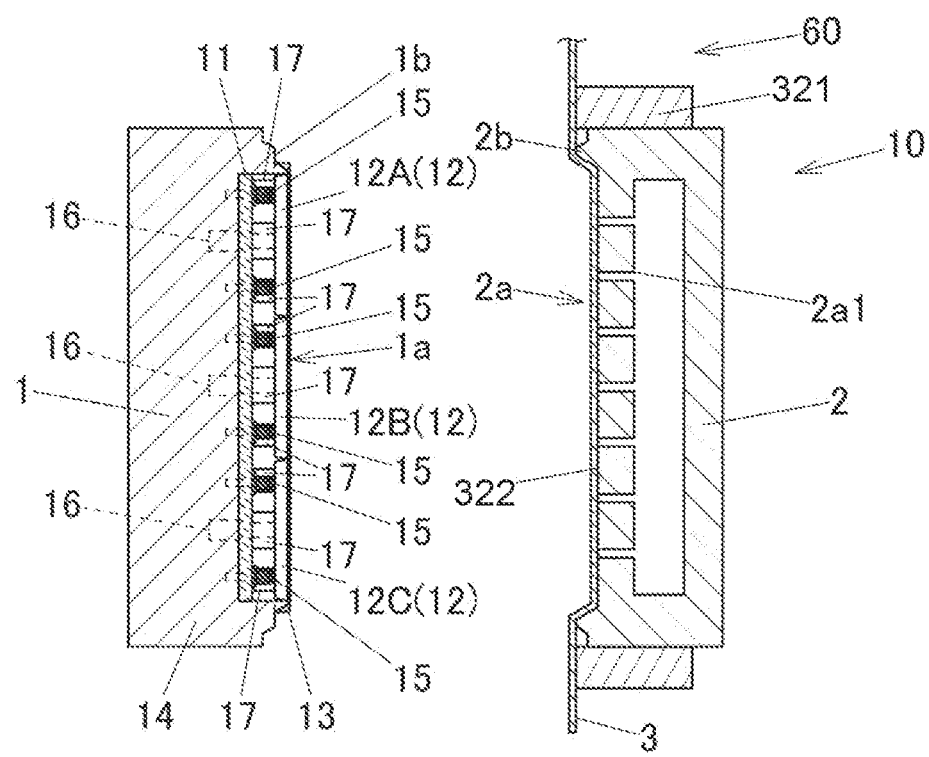
FIG. 18B shows a manufacturing method of a molded body according to the embodiment of the third viewpoint of the present invention in which the molten resin sheet is shaped in a mold.

In a shaping step, the mold frame 321 is moved toward the molten resin sheet 3 and abuts against a sheet surface of the molten resin sheet 3 (see FIG. 18A). Then, the mold frame 321 and the second mold 2 are brought relatively closer to each other, and the space formed by the molten resin sheet 3, the cavity 2a, and the mold frame 321 is depressurized by sucking air through the suction hole 2a1, so that the molten resin sheet 3 is shaped by the cavity 2a (see FIG. 18B).

Figure 19:
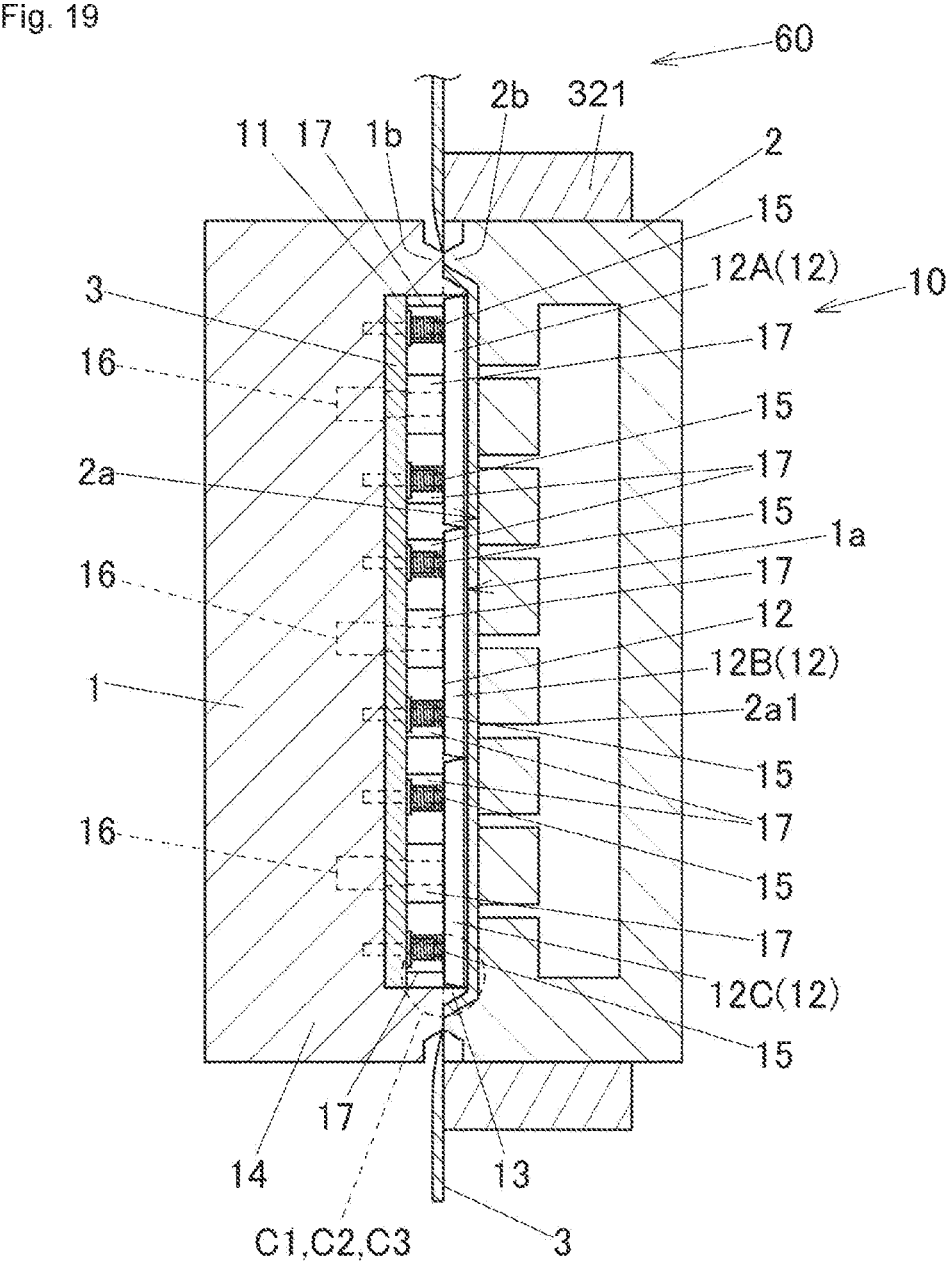
FIG. 19 shows the manufacturing method of the molded body according to the embodiment of the third viewpoint of the present invention and shows a state in which the first mold and a second mold are clamped.

In a mold clamping step, the first mold 1 and the second mold 2 are brought relatively close to each other and are clamped so that annular pinch-off portions 1b, 2b are in contact with each other (see FIG. 19). That is, the first mold 1 and the second mold 2 abut against the molten resin sheet 3 so as to directly sandwich it from both sides. At the initial timing (first timing) at which the slide portion 12 abuts against the molten resin sheet 3 by clamping the molds, as shown in the enlarged view of a portion C1 in FIG. 20A, the molten resin sheet 3 first comes into contact with the projecting portion 122 (the projecting surface 123) of the slide portion 12 and is pressed by this projecting portion 122. Similarly, in the vicinity of the fixing portion 13, the molten resin sheet 3 first comes into contact with a projecting portion 133 (projecting surface 133c) of the fixing portion 13. Therefore, the cooling of the molten resin sheet 3 is started from a portion in contact with the projecting portions 122, 133.

Figure 20A:
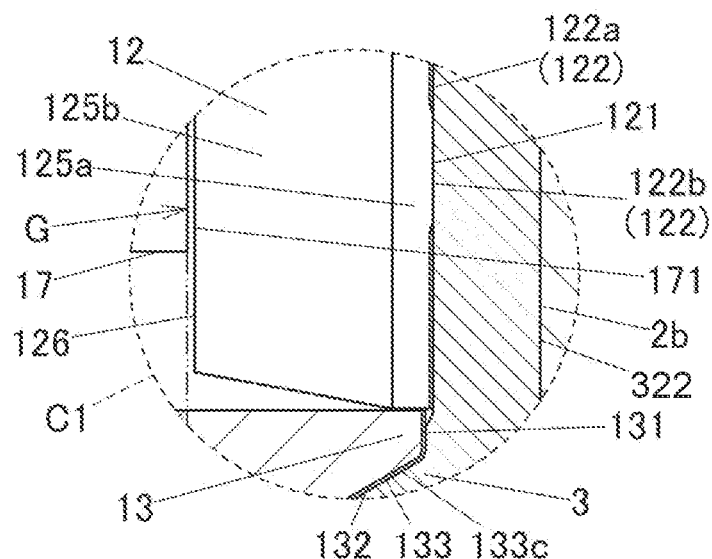
FIG. 20A is an enlarged view showing a state in which the first mold and the second mold according to the embodiment of the third viewpoint of the present invention are clamped in an initial state in which the molten resin sheet and a projecting portion are brought into contact with each other.
Figure 20B:
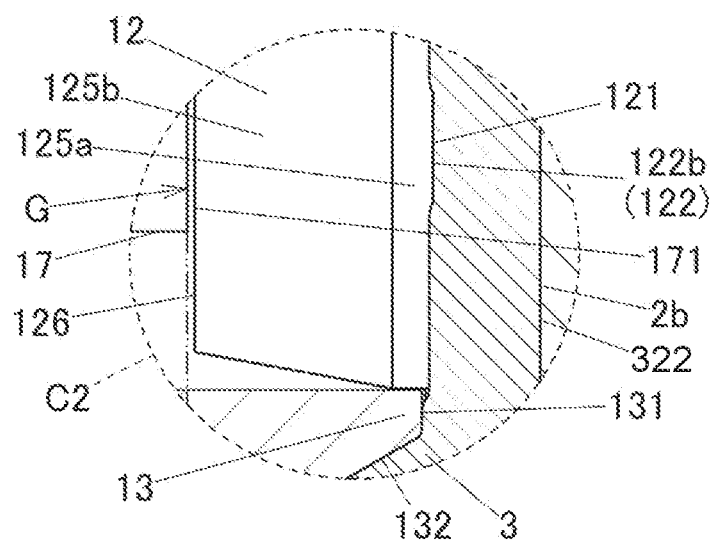
FIG. 20B is an enlarged view showing a state in which the first mold and the second mold according to the embodiment of the third viewpoint of the present invention are clamped in which the molten resin sheet is brought into contact with an abutting surface.

Then, at the timing (the second timing after the above-mentioned first timing) at which a predetermined time has elapsed from the state of FIG. 20A, as shown in the enlarged view of the portion C2 in FIG. 20B, the molten resin sheet 3 flows around the portion in contact with the projecting portions 122, 133 and comes into contact with the abutting surfaces 121, 131. On a side of the side surfaces 132, 135 of the fixing portion 13, the molten resin sheet 3 flows around a portion in contact with the projecting portion 133 and comes into contact with the side surfaces 132, 135. Consequently, the surface of the molten resin sheet 3 on the side of the first mold 1 is started to be cooled over substantially the entire surface. In this regard, since a portion of the molten resin sheet 3 corresponding to the projecting portions 122, 133 comes into contact with them before the contact with the abutting surfaces 121, 131, or it has a thinner wall thickness than the peripheral portion corresponding to the abutting surfaces 121, 131, the lattice-shaped region on the molten resin sheet 3 (a region corresponding to the concave portion 352 of the molded body 305 in FIG. 18A and FIG. 18B) can be cooled in priority to the other region.

Figure 20C:
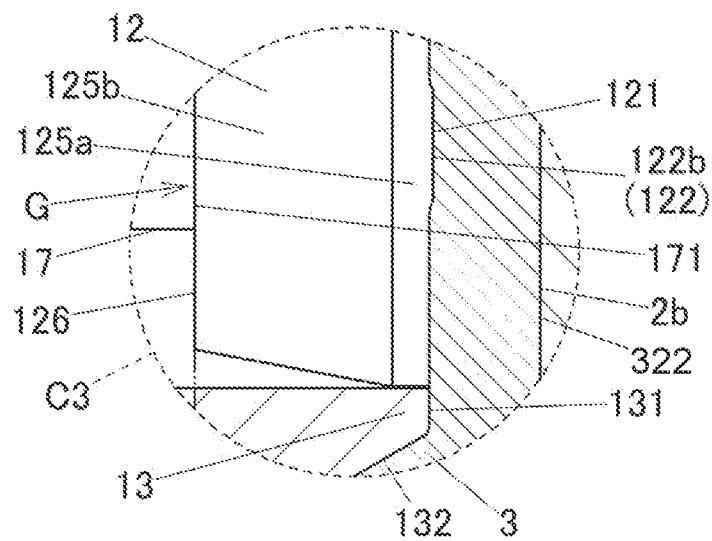

The slide portion 12 moves to a side opposite to the second mold 2 (side opposite to the molten resin sheet) when the reaction force received from the molten resin sheet 3 becomes larger than the resilient force of the resilient portion 15 due to the mold clamping force between the first mold 1 and the second mold 2. The movement of the slide portion 12 is restricted by the back surface 126 coming into contact with the end surface 171 of the second restriction portion 17. When the slide portion 12 is pushed in until it abuts against the second restriction portion 17, the abutting surface 121 and the abutting surface 131 are arranged on substantially the same surface, as shown in the enlarged view of the portion C3 in FIG. 20C.

Then, in a removal step, the first mold 1 and the second mold 2 are opened, and the molded body 305 after molding is removed from the mold 10. Further, the molded body 305 is released from the mold before it is completely cooled and hardened as a whole, and a burr on the outer periphery is removed. Since the molded body 305 in the present embodiment has the lattice-shaped region (the region corresponding to the concave portion 352 in FIG. 18A and FIG. 18B) in which hardening has progressed more than the region in contact with the abutting surfaces 121, 131, the overall strength of the molded body 305 can be increased even if it is removed from the mold 10. Therefore, it is possible to suppress the warp of the molded body 305 removed from the mold 10. The molded body 305 can be formed, for example, as a wall panel used for a toilet unit, a bathroom unit, a shower unit, a prefabricated architecture, and the like.

The molten resin sheet 3 hanging down from the T die 71 in FIG. 14 may have different sheet thickness over a region corresponding to the core 1a and the cavity 2a of the first mold 1 and the second mold 2. For example, the molten resin sheet 3 may be elongated on a side of the T die 71 due to its own weight so that the thickness of the molten resin sheet 3 on the lower end side below the T die 71 is formed thinner. In this case, when the molds are clamped in FIG. 19, the slide portion 12C among a plurality of slide portions 12A to 12C arranged on a lower side abuts against the molten resin sheet 3 before the other slide portions 12A, 12B arranged on an upper side abut against it, and then the slide portion 12B and the slide portion 12A abut against the molten resin sheet 3 in this order. Further, when the lower portion of the molten resin sheet 3 corresponding to the slide portion 12C is relatively thick, the press-in amount of the slide portion 12C becomes larger than that of the slide portion 12A and the slide portion 12B. Therefore, the press-in amount of the slide portions 12A to 12C (the same applies to the slide portions 12D to 12F shown in FIG. 15) can independently vary depending on the thickness of the molten resin sheet 3.

Therefore, even when a thin portion is generated on the molten resin sheet 3, it is possible to prevent the first mold 1 from failing to abut against the molten resin sheet 3, and thus the cooling unevenness on the molten resin sheet 3 can be reduced.

FIG. 21 shows an example of the molded body 305 manufactured by the resin molding device. The molded body 305 is formed in the shape of a substantially flat plate having a long rectangular shape. A front surface 305a of the molded body 305 shown in FIG. 21 is a molded surface molded by the second mold 2. Further, on a back surface 305b on a side opposite to the front surface 305a of the molded body 305, an abutted surface 351 and the concave portion 352 (352a, 352b) molded by the abutting surface 121 and the projecting surface 123 of the first mold 1 are provided, as shown by the broken line. The concave portion 352a corresponds to the first projecting portion 122a, and the concave portion 352b corresponds to the second projecting portion 122b. An outer peripheral portion 353 is a region formed by the fixing portion 13. In this regard, while the front surface 305a of the molded body 305 is configured as a substantially flat surface in this example, any concave and convex portions can be provided. Even in such a case, since the concave portion 352 is provided thinner than the wall thickness of the molten resin sheet 3, it is possible to reduce the impacts on the function or design of the front surface 305a of the molded body 305.

As described above, according to the present embodiment, one surface side of the molten resin sheet 3 comes into contact with the second mold 2, and on the other surface side of the molten resin sheet 3, the portion of the molten resin sheet 3 corresponding to the projecting portions 122, 136 comes into contact with them in priority to the other portion. It is possible to improve the hardening speed of the portion of the molten resin sheet 3 corresponding to the projecting portions 122, 136 and to reduce the cooling unevenness as a whole to reduce the warp of the molded body 305. Further, since the molded body 305 can be formed so as not to warp, the molded body 305 can be removed after a short cooling time, and thus the productivity of the molded body 305 can be improved.

The embodiment of the present invention is described above, and the present invention is not limited to the embodiments and can be implemented with various modifications. For example, although the first mold 1 is provided with the slide portion 12 slidably movable by the reaction force from the molten resin sheet 3 in the present embodiment, the slide portion 12 may not be provided depending on the characteristics of the molten resin sheet 3. In such a case, the first mold 1 can be simply configured.

Further, although the first mold 1 is a convex mold and the second mold 2 is a concave mold in the present embodiment, the first mold 1 including the slide portion 12 may be a concave mold. Alternatively, the second mold 2 as well as the first mold 1 may be provided with a slide portion.

Further, the projecting surface 123 of the projecting portion 122 may be provided over a part of the abutting surface 121 but is preferably provided over an area of half or more, more preferably 80% or more of the abutting surface 121 (the surface of the molded body 305). The overall strength of the molded body 305 can be increased by increasing the area ratio of the projecting surface 123 to the abutting surface 121.

Further, when the projecting surface 123 is provided on a part of the abutting surface 121, the projecting surface 123 can be provided in the region of the abutting surface 121 where a flat portion (including a curved surface portion having a relatively small curvature) is large. For example, the projecting surface 123 can be provided in a region where the flat portion occupies an area of 30% or more with respect to the entire abutting surface 121. By partially providing the projecting surface 123, the structure of the mold can be simplified.

REFERENCE SIGNS LIST

1: first mold, 1a: core, 1b: pinch-off portion, 2: second mold, 2a: cavity, 2a1: suction hole, 2b: pinch-off portion, 3: molten resin sheet, 4: support arm, 5: resilient member, 10: mold, 11: base portion, 12: slide portion, 12A: slide portion, 12B: slide portion, 12C: slide portion, 12D: slide portion, 12E: slide portion, 12F: slide portion, 13: fixing portion, 14: moving mold, 15: resilient portion, 16: first restriction portion, 17: second restriction portion, 41: support beam, 42: base plate member, 42A: base plate member, 42B: base plate member, 43: frame member, 44: support body, 44A: support body, 44B: support body, 44C: support body, 44D: support body, 51: shaft holder, 52: shaft member, 53: guide bush, 54: coil spring, 55: screw member, 56: washer, 57: washer, 58: screw member, 59: washer, 60: resin molding device, 61: resin supply device, 61A: first resin supply device, 61B: second resin supply device, 65: hopper, 66: extruder, 68: hydraulic motor, 70: accumulator, 71: T die, 72: plunger, 79: roller, 80: mold, 81: first mold, 81a: cavity, 81b: pinch-off portion, 82: second mold, 82a: cavity, 82b: pinch-off portion, 83: mold frame, 84: mold frame, 111: bearing, 112: bearing, 121: abutting surface, 122: projecting portion, 122a: first projecting portion, 122b: second projecting portion, 123: projecting surface, 125: side surface, 125a: parallel surface, 125b: inclined surface, 126: back surface, 131: abutting surface, 132: side surface, 133: projecting portion, 133a: third projecting portion, 133b: fourth projecting portion, 133c: projecting surface, 134: projecting wall portion, 135: side surface, 136: projecting portion, 141: slide space, 151: shaft, 152: bush, 153: compression coil spring, 161: supporting shaft portion, 162: enlarged portion, 171: end surface, 201: sandwich member, 202: core material, 203: skin material, 211: first molten resin sheet, 212: second molten resin sheet, 221: facing surface, 305: molded body, 305a: front surface, 305b: back surface, 321: mold frame, 322: abutting surface, 351: abutted surface, 352: concave portion, 352a: concave portion, 352b: concave portion, 353: outer peripheral portion, 421: opening, 441: opening, 442: suction portion, 443: support surface, 511: cylindrical portion, 511a: opening, 511b: end portion, 512: flange portion, 521: female screw portion, 522: female screw portion, 531: flange portion, 532: cylindrical portion, 532a: end portion, 533: bearing portion, 533a: ball bearing, 601: molding system, 602: hydraulic mechanism, 602a: cylinder, 602b: piston, 603: core material, 610: first parison forming device, 611: first parison, 611a: first resin sheet, 612: first hopper, 613: first extruder, 614: first accumulator, 614a: cylinder, 614b: piston, 615: first hydraulic mechanism for injection, 615a: cylinder, 615b: piston, 616: first injection head, 617: first roller unit, 617a: roller, 618: first raw resin, 618a: first molten resin, 620: second parison forming device, 621: second parison, 621a: second resin sheet, 622: second hopper, 623: second extruder, 624: second accumulator, 624a: cylinder, 624b: piston, 625: second hydraulic mechanism for injection, 625a: cylinder, 625b: piston, 626: second injection head, 627: second roller unit, 627a: roller, 628: second raw resin, 628a: second molten resin, 630: first mold unit, 631: first mold, 631a: cavity surface, 631b: pinch-off portion, 632: first mold frame, 633: first platen, 640: second mold unit, 641: second mold, 641a: cavity surface, 641b: pinch-off portion, 642: second mold frame, 643: second platen, 650: robot hand, 650a: base, 650b: suction pad, 660: control device, 661: storage unit, 662: control unit

The invention claimed is:
1. A molding system, comprising:
first and second parison forming devices;
first and second molds configured to be opened and closed; and
a control unit,
wherein the first parison forming device comprises a first extruder, a first accumulator, and a first injection head,
the first parison forming device is configured to form a first parison by injecting a first molten resin from the first injection head after the first molten resin extruded from the first extruder is accumulated in the first accumulator, the second parison forming device comprises a second extruder, a second accumulator, and a second injection head, the second parison forming device is configured to form a second parison by injecting a second molten resin from the second injection head after the second molten resin extruded from the second extruder is accumulated in the second accumulator, the first and second parisons are injected between the first and second molds, the control unit is configured to determine a timing of starting operation of at least one of the first and second parison forming devices and the first and second molds in a next cycle on the basis of history data in a past cycle;

wherein the first parison is a first resin sheet, the first resin sheet is fed by a roller arranged between the first injection head and the first and second molds, and the control unit is configured to determine a rotation speed of the roller in the next cycle on the basis of the history data in the past cycle, the history data are a length of the first and second resin sheets, when a deviation of the length of the first and second resin sheets from a target value is equal to or larger than a threshold value in an immediately preceding cycle, the control unit makes a correction to increase or decrease the rotation speed of the roller in the next cycle.

2. The molding system of claim 1, wherein the control unit is configured to determine a timing of starting injection of the first and second molten resins in the next cycle on the basis of the history data in the past cycle.

3. The molding system of claim 1, wherein the first and second molds are configured to move to a mold opening position, a standby position, and a mold closing position, the standby position is a position in which a distance between the first and second molds is smaller than in the mold opening position and the distance between the first and second molds is larger than in the mold closing position, and the control unit is configured to determine a timing at which the first and second molds start moving from the mold opening position to the standby position in the next cycle on the basis of the history data in the past cycle.

4. The molding system of claim 1, wherein the control unit is configured to determine a timing of starting rotation of a screw of the first extruder in the next cycle on the basis of the history data in the past cycle.

\* \* \* \* \*